United States Patent
Hormuth et al.

(10) Patent No.: US 11,221,858 B1
(45) Date of Patent: Jan. 11, 2022

(54) SYSTEM CONTROL PROCESSOR (SCP) BOOT SYSTEM

(71) Applicant: Dell Products L.P., Round Rock, TX (US)

(72) Inventors: Robert W. Hormuth, Cedar Park, TX (US); William Price Dawkins, Lakeway, TX (US); Gaurav Chawla, Austin, TX (US); Mark Steven Sanders, Roanoke, VA (US); Jimmy D. Pike, Georgetown, TX (US); Elie Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/064,824

(22) Filed: Oct. 7, 2020

(51) Int. Cl.
  *G06F 9/44* (2018.01)
  *G06F 9/4401* (2018.01)
  *H04L 29/08* (2006.01)

(52) U.S. Cl.
  CPC ............ *G06F 9/441* (2013.01); *G06F 9/4408* (2013.01); *G06F 9/4416* (2013.01); *G06F 9/4418* (2013.01); *H04L 67/1097* (2013.01)

(58) Field of Classification Search
  CPC ...... G06F 9/441; G06F 9/4408; G06F 9/4416; G06F 9/4418; H04L 67/1097
  See application file for complete search history.

(56) References Cited

U.S. PATENT DOCUMENTS

| | | | |
|---|---|---|---|
| 7,360,072 B1* | 4/2008 | Soltis | G06F 9/4416 709/222 |
| 8,214,633 B2 | 7/2012 | Paul et al. | |
| 2003/0037189 A1* | 2/2003 | Morgan | G06F 9/4408 710/36 |
| 2014/0164830 A1 | 6/2014 | Slater et al. | |
| 2014/0281466 A1* | 9/2014 | Samuel | G06F 9/441 713/2 |

* cited by examiner

*Primary Examiner* — Stefan Stoynov
(74) *Attorney, Agent, or Firm* — Joseph Mencher

(57) ABSTRACT

An SCP boot system includes a chassis housing a BIOS and an SCP that presents a virtual BIOS boot media location to the BIOS. The SCP may receive a first physical boot media location from a management system and, when the SCP receives a first BIOS boot image retrieval request from the BIOS that is directed to the virtual BIOS boot media location, it retrieves a first BIOS boot image from the first physical boot media location and provides it to the BIOS. The SCP may then receive a second physical boot media location from the management system and, when the SCP subsystem receives a second BIOS boot image retrieval request from the BIOS that is directed to the virtual BIOS boot media location, it retrieves a second BIOS boot image from the second physical boot media location and provides it to the BIOS.

20 Claims, 20 Drawing Sheets

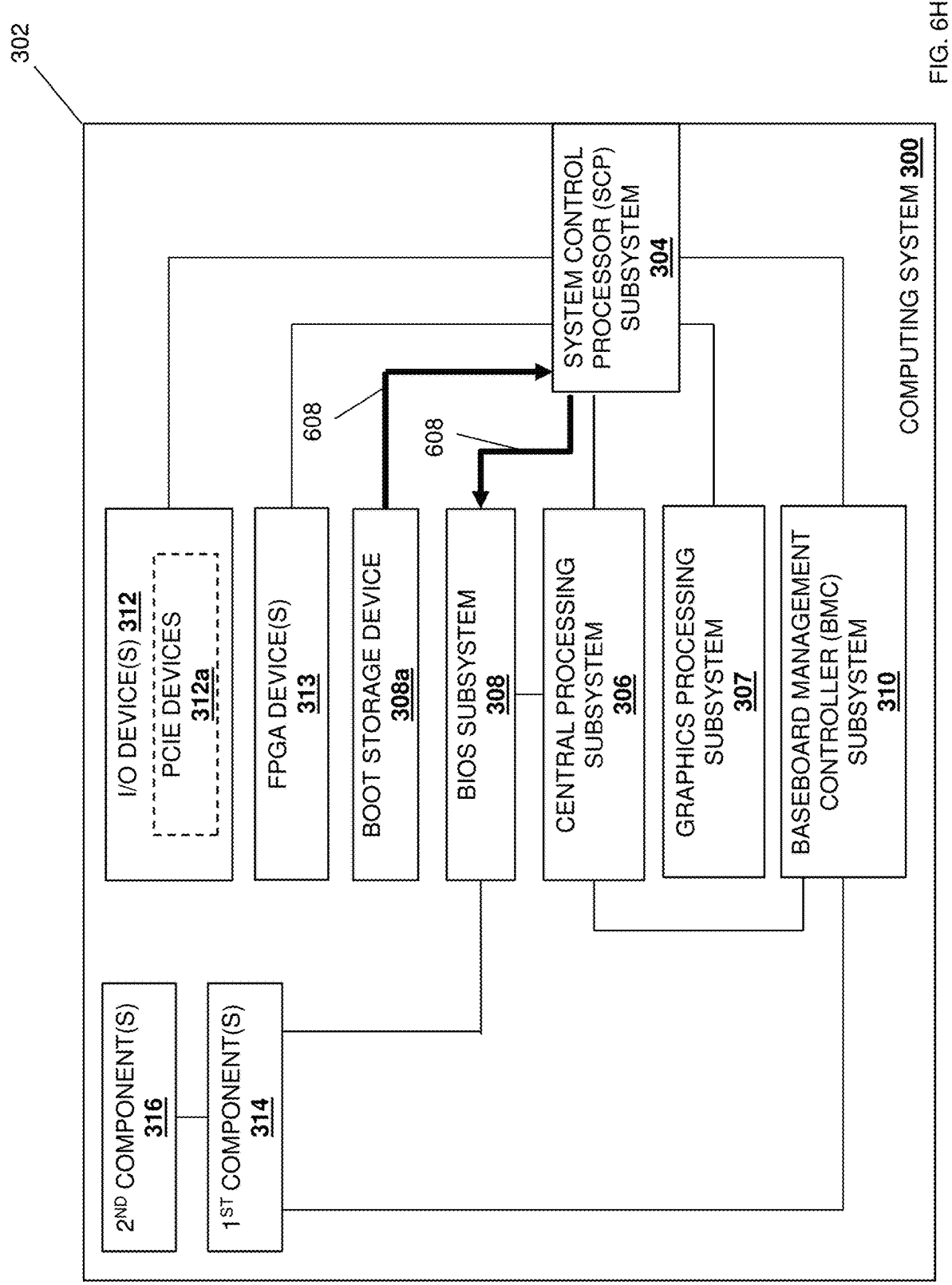

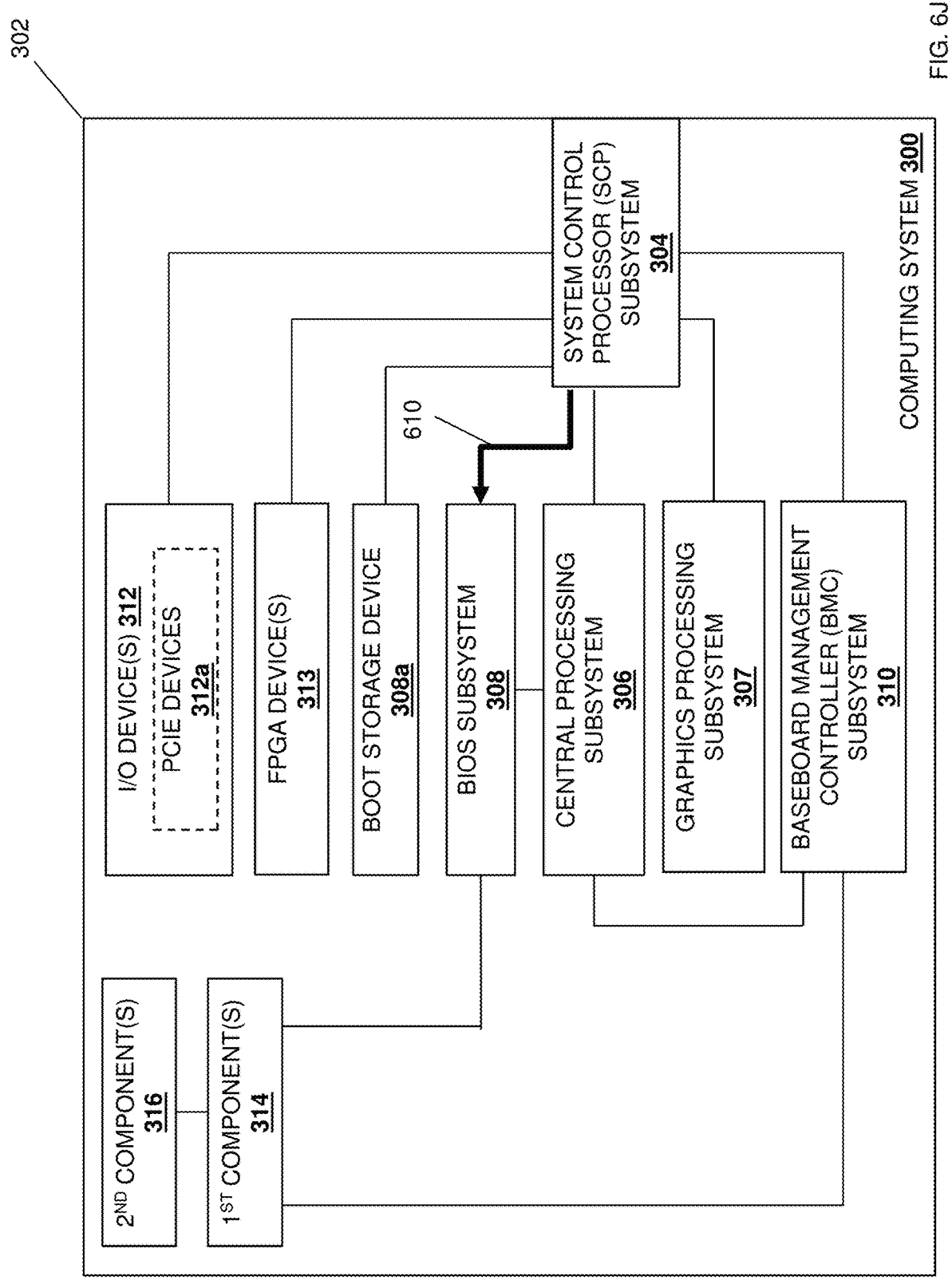

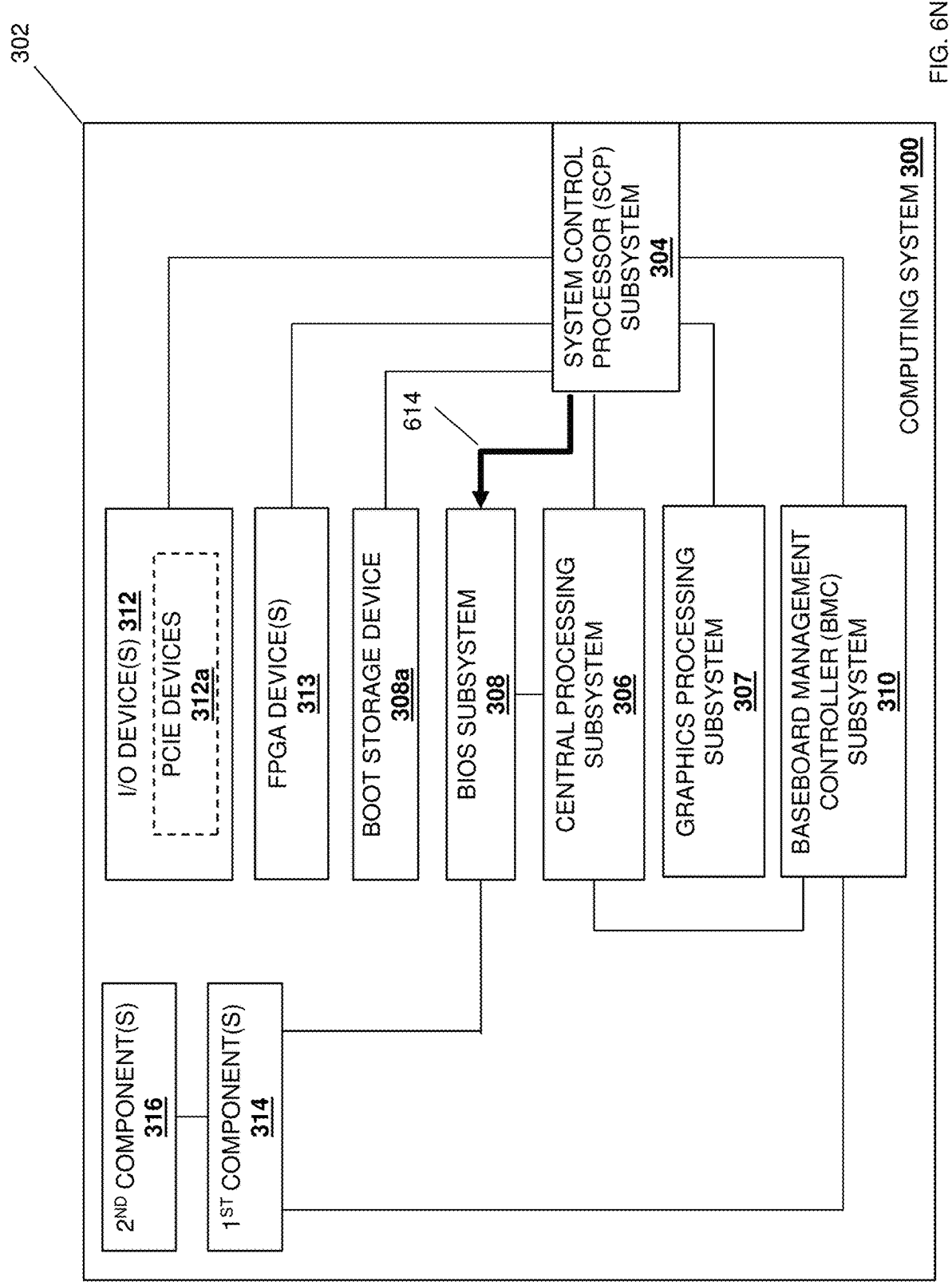

SYSTEM CONTROL PROCESSOR (SCP) BOOT SYSTEM

BACKGROUND

The present disclosure relates generally to information handling systems, and more particularly to booting an information handling system using a System Control Processor (SCP) subsystem.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing systems known in the art, perform boot operations in order to initialize the server device to perform runtime operations. For example, server devices typically include a BIOS subsystem that performs boot operations using a BIOS boot image that may be accessible at a plurality of different BIOS boot image locations such as a boot media storage device (e.g., a hard disk drive or solid state drive included in the server device, a Universal Serial Bus (USB) device connected to the server device, etc.), a Preboot Execution Environment (PXE) server system connected to the server device via a network, a network-attached storage system connected to the server device via a network, and/or a variety of other BIOS boot image locations that would be apparent to one of skill in the art. Conventional BIOS boot systems typically include a non-volatile memory device that is provided in (or accessible to) the BIOS subsystem, and that non-volatile memory device stores a prioritized list of BIOS boot image locations that the BIOS subsystem will use to determine where to retrieve the BIOS boot image (i.e., from the highest priority BIOS boot image location that is currently available), and that are configured to be modified by a user to adjust the BIOS boot image location at which the BIOS subsystem will retrieve the BIOS boot image. Such conventional BIOS boot systems can raise some issues.

For example, each time a network administrator or other user wishes to change the boot image location utilized by the BIOS subsystem in a server device to retrieve the BIOS boot image, that network administrator or other user must manually change the prioritized list of BIOS boot image locations in the non-volatile memory device accordingly. Such manual operations are time-consuming, particularly when a network administrator or other user wishes to change the boot image location utilized by the BIOS subsystem in many server devices (e.g., hundreds or even thousands of server devices in a datacenter). Conventional solutions to such issues have been to utilize a Baseboard Management Controller (BMC) device in each server device to change the boot image location utilized by the BIOS subsystem in that server device, which allows a network administrator or other user to send an instruction to the BMC device in any server device in order to have that BMC device access the non-volatile memory device and change the prioritized list of BIOS boot image locations stored thereon accordingly. However, such solutions still require a "middle man" (i.e., the BMC device) to perform the actual modification of the BIOS boot image location that will be utilized by the BIOS subsystem in each server device, and still require the BIOS subsystem to implement a modifiable BIOS boot image location subsystem that requires non-volatile memory space that is accessible to the BIOS subsystem.

Accordingly, it would be desirable to provide a boot system that addresses the issues discussed above.

SUMMARY

According to one embodiment, a System Control Processor (SCP) boot system includes an SCP processing system; and an SCP memory system that is coupled to the SCP processing system and that includes instructions that, when executed by the SCP processing system, cause the SCP processing system to provide an SCP boot services engine that is configured to: receive, from a management system via a network, a first physical boot media location; present, to a BIOS subsystem, a virtual BIOS boot media location; receive, from the BIOS subsystem, a first BIOS boot image retrieval request that is directed to the virtual BIOS boot media location; retrieve, in response to receiving the first BIOS boot media retrieval request that is directed to the virtual BIOS boot media location, a first BIOS boot image from the first physical boot media location; and provide the first BIOS boot image to the BIOS subsystem.

BRIEF DESCRIPTION OF THE DRAWINGS

FIG. 6H is a schematic view illustrating an embodiment of the computing system of FIG. 3A operating during the method of FIG. 5.

FIG. 6J is a schematic view illustrating an embodiment of the computing system of FIG. 3A operating during the method of FIG. 5.

FIG. 6N is a schematic view illustrating an embodiment of the computing system of FIG. 3A operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
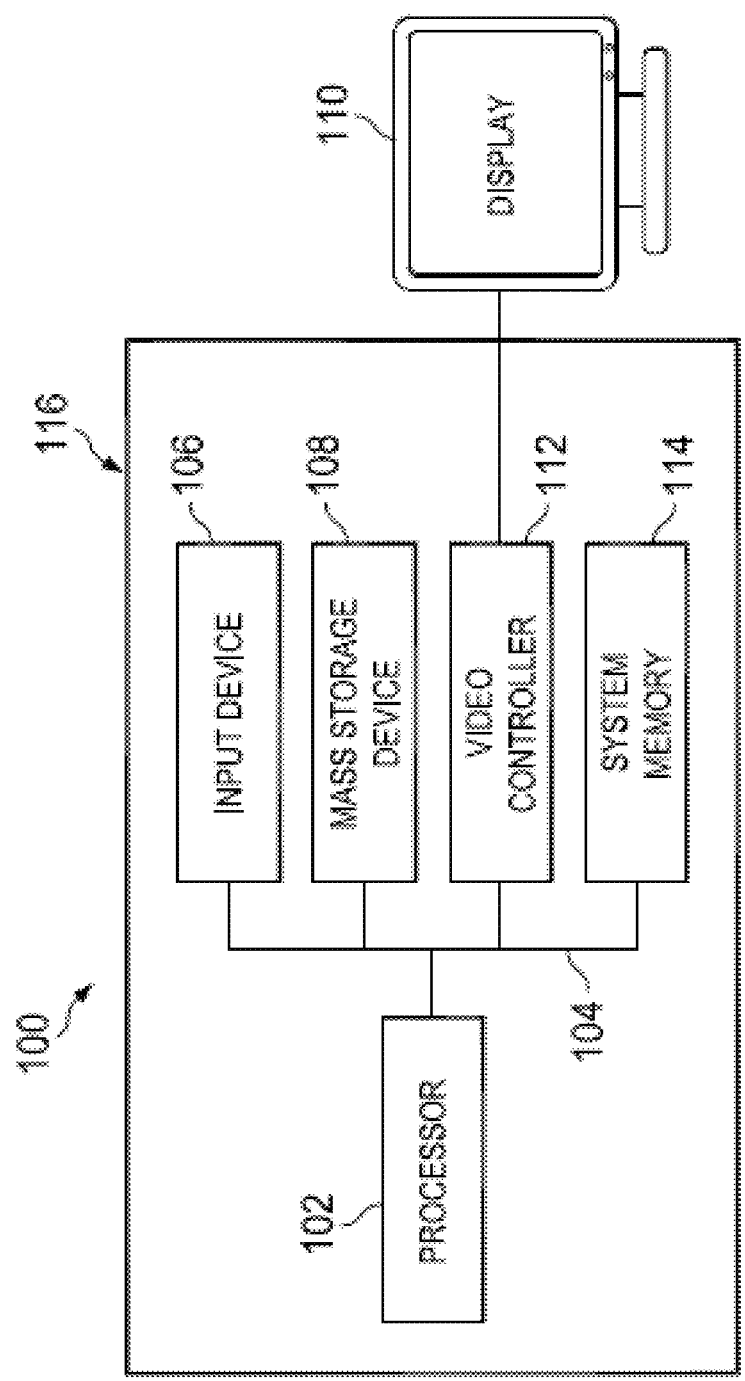
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
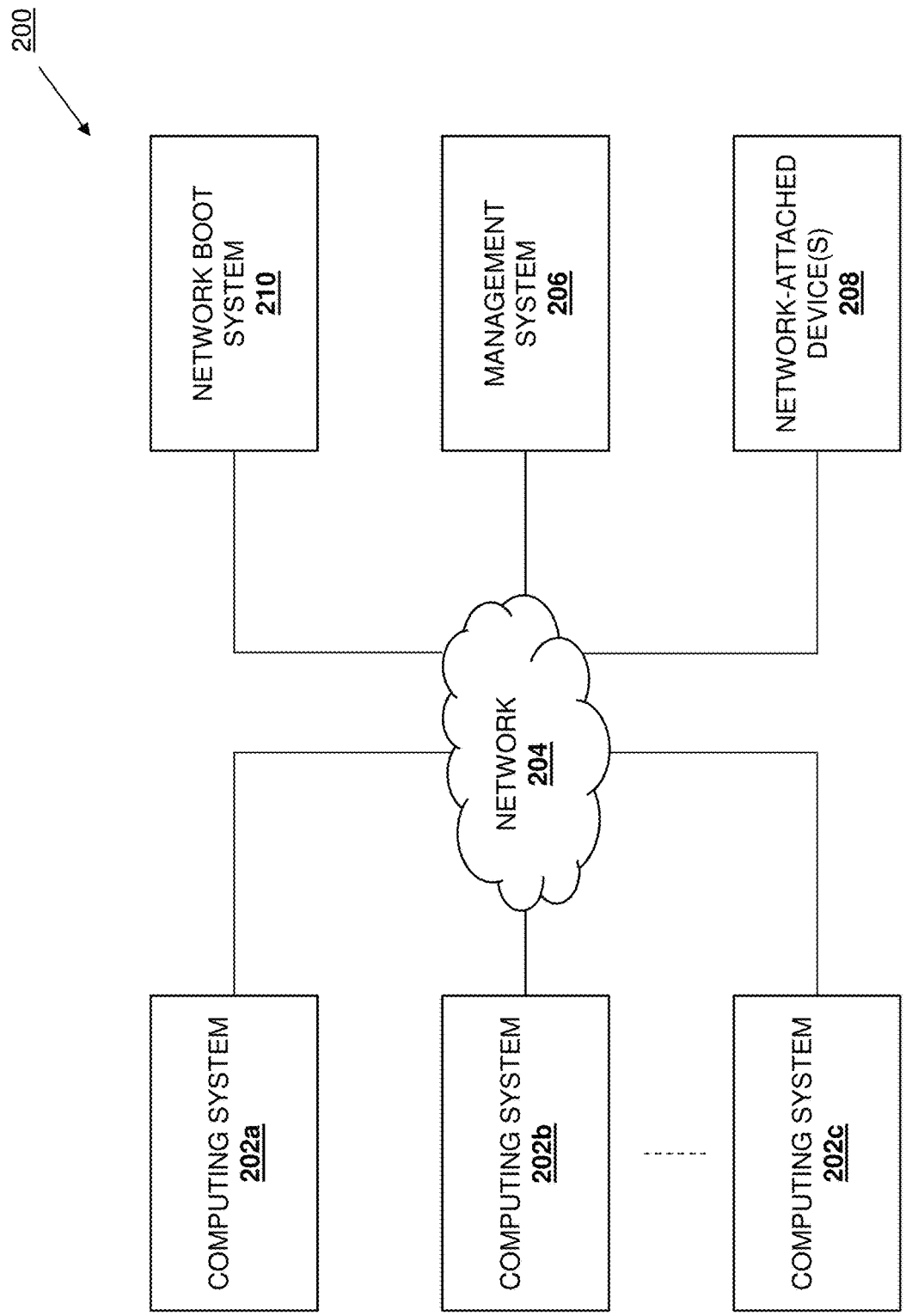
FIG. 2 is a schematic view illustrating an embodiment of a networked system.

Referring now to FIG. 2, an embodiment of a networked system 200 is illustrated in which the SCP boot system of the present disclosure may be utilized. In the illustrated embodiment, the networked system 200 includes a plurality of computing systems 202a, 202b, and up to 202c. In an embodiment, any or all of the computing systems 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c (e.g., an SCP manager system for the SCP subsystems included in the computing systems 202a-202c discussed below). In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express Over Fabric (NVMe-OF) storage devices that may be configured to provide a network-attached storage system for any or all of the computing systems 202a-202c.

In the illustrated embodiment, a network boot system 210 is also coupled to the network 204. In an embodiment, the network boot system 210 may be provided by the IHS 100 discussed above with reference to FIG. 1, and/or may include some or all of the components of the IHS 100, and in specific examples may be provided by one or more server devices that may be configured to perform boot image provisioning functionality for the computing systems 202a-202c (e.g., a Preboot Execution Environment (PXE) server system as discussed below). However, while a specific networked system 200 has been illustrated and described, one of skill in the art in possession of the present disclosure will recognize that the SCP boot system of the present disclosure may be utilized with a variety of components and component configurations, and/or may be provided in a variety of computing system/network configurations, while remaining within the scope of the present disclosure as well.

Figure 3A:
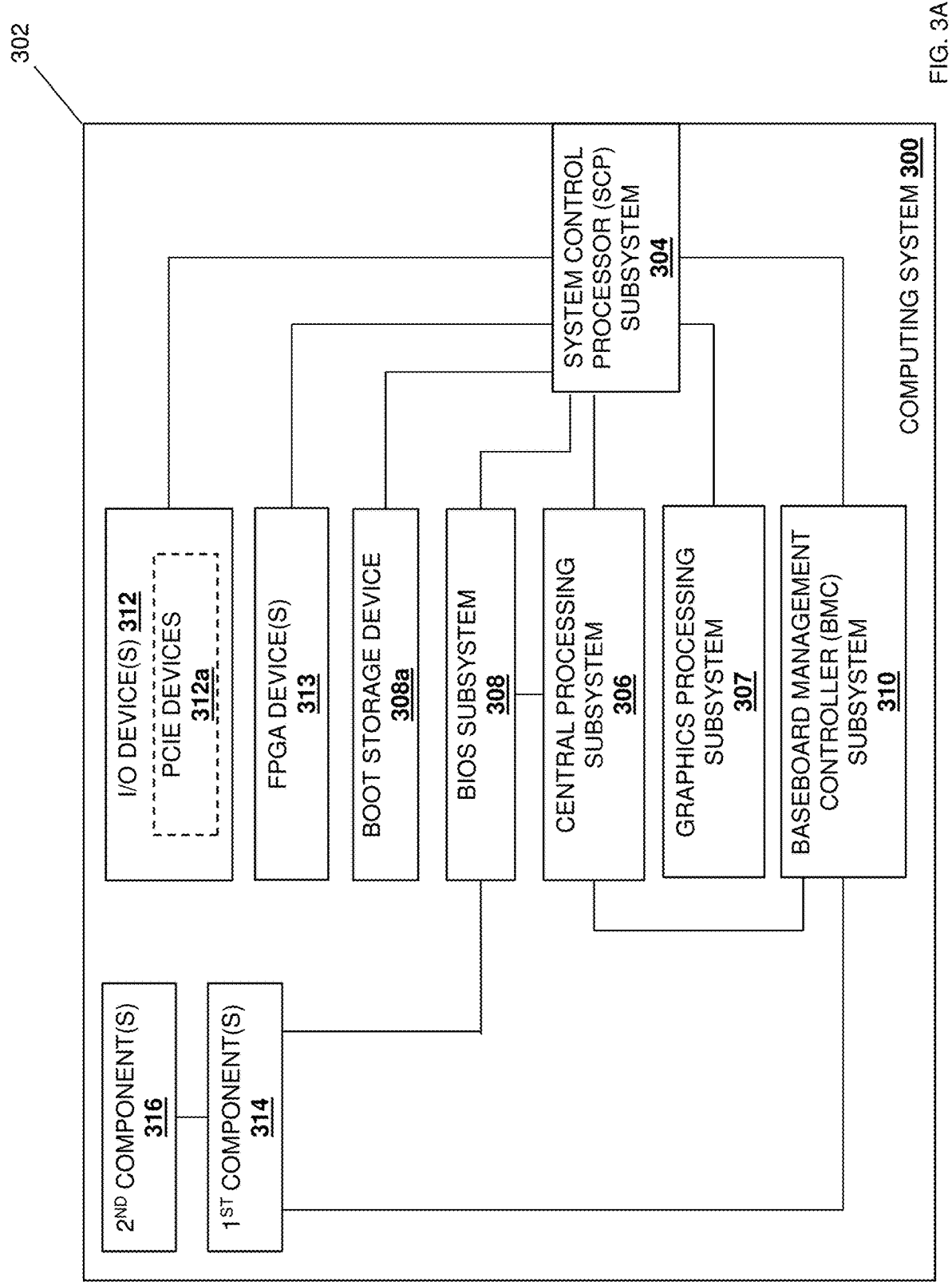
FIG. 3A is a schematic view illustrating an embodiment of a computing system that may be included in the networked system of FIG. 2 and that may utilize the SCP boot system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated and discussed below.

For example, the chassis 302 may house a System Control Processor (SCP) subsystem 304 that is provided according to the teachings of the present disclosure to perform the SCP boot functionality that is discussed in further detail below. In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples, the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a boot storage device 308a that is coupled to the SCP subsystem 304, and that one of skill in the art in possession of the present disclosure will recognize may store one or more boot images that may be accessible to the SCP subsystem 304 and provided to the BIOS subsystem 308 during the boot operations as discussed below. For example, the boot storage device 308a may be provided by Boot Optimized Storage Solution (BOSS) available from DELL® Inc. of Round Rock, Tex., United States, and may be connected to the SCP subsystem 304 (e.g., via an expansion slot on the SCP subsystem 304) and/or located "behind" the SCP subsystem 304 (e.g., only accessible via the SCP subsystem 304), although other boot storage devices and/or boot storage device configurations will fall within the scope of the present disclosure as well. As will be appreciated by one of skill in the art in possession of the present disclosure, the boot storage device 308a illustrated in FIG. 3A is not directly accessible to the BIOS subsystem 308 and, as such, any boot images stored in the boot storage device 308a may only be accessible to the BIOS subsystem 308 via the SCP subsystem 304 in the examples below. However, one of skill in the art in possession of the present disclosure will recognize that some computing systems/server devices in which an SCP subsystem is provided may include a direct connection between the boot storage device 308a and the BIOS subsystem 308 while remaining within the scope of the present disclosure as well.

In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure.

The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well. The chassis 302 may also house one or more Field Programmable Gate Array (FPGA) device(s) 313 that are coupled to the SCP subsystem 304, and that may be programmed to perform any of a variety of functions for the computing system 300 and/or the SCP subsystem 304.

Figure 3B:
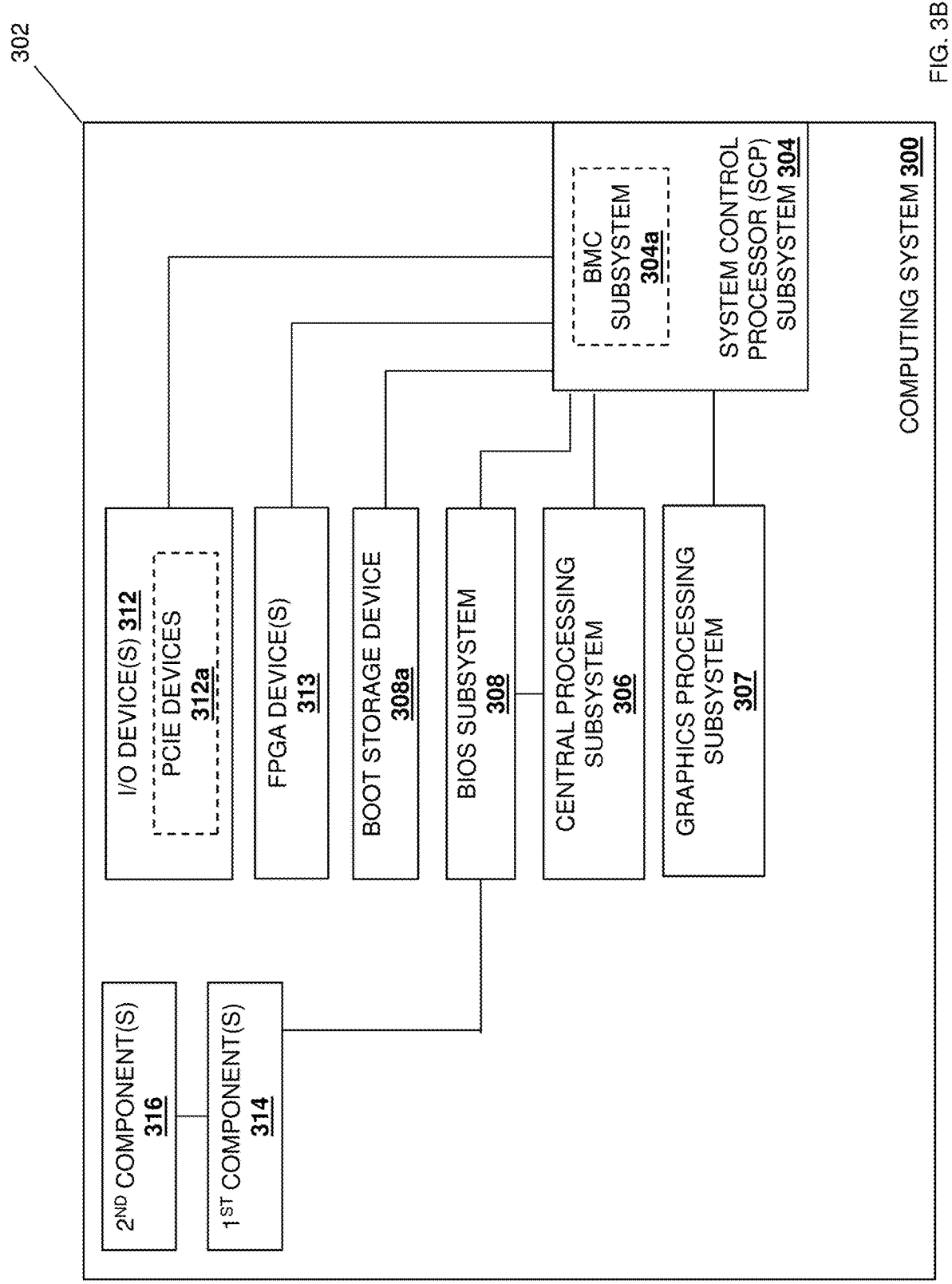
FIG. 3B is a schematic view illustrating an embodiment of a computing device that may be included in the networked system of FIG. 2 and that may utilize the SCP boot system of the present disclosure.

The chassis 302 may also house one or more first components 314 that are coupled to each of the BIOS subsystem 308 and the BMC subsystem 310, and one or more second components 316 that are coupled to at least one of the first components 314. In specific examples, the first component(s) 314 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
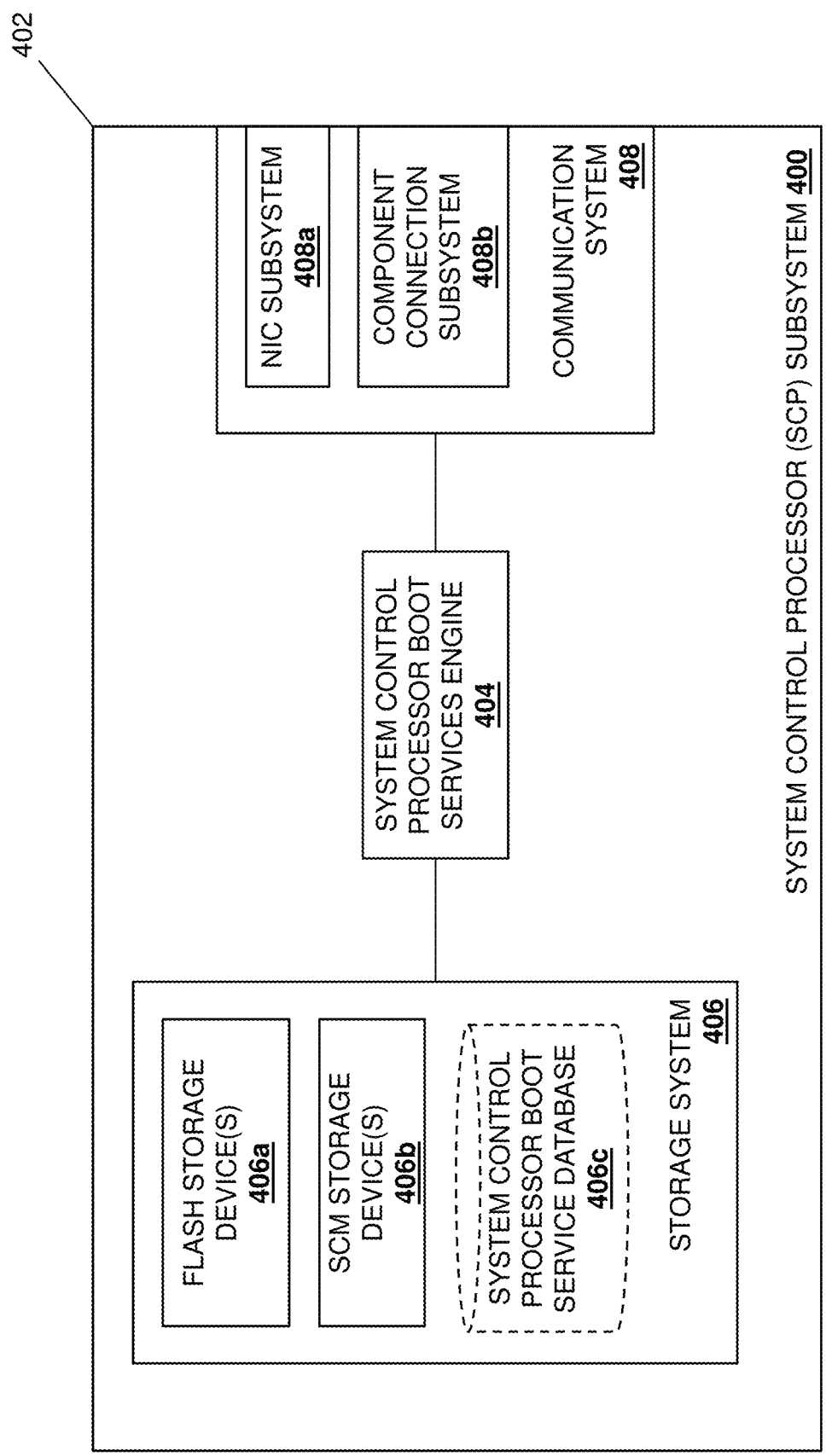
FIG. 4 is a schematic view illustrating an embodiment of an SCP subsystem that may be included in the computing device of FIG. 3A or 3B, and that may provide the SCP boot system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 300, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 302 may support an SCP processing system including one or more SCP processors (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP boot services engine 404 that is configured to perform the functionality of the SCP boot services engines and/or SCP subsystems discussed below. In a specific example, the SCP processing system providing the SCP boot services engine 404 may be provided by ARM cores in an ARM-based processor, although other processing systems will fall within the scope of the present disclosure as well.

The chassis 302 may also support a storage system 406 (e.g., which may include the storage 108 discussed above with reference to FIG. 1, the SCP memory system discussed above, etc.) that is coupled to the SCP boot services engine 404 (e.g., via a coupling between the storage system and the SCP processing system) and that, in the illustrated embodiment, includes one or more flash storage device(s) 406a, and one or more Storage Class Memory (SCM) storage devices 406b. However, while a few specific storage devices are illustrated and described below, one of skill in the art in possession of the present disclosure will appreciate that the storage system 406 may include a variety of other storage devices that will fall within the scope of the present disclosure as well. As illustrated, the storage system 406 may provide an SCP boot services database 406c that may include SCP subsystems settings, as well as any information utilized by the SCP boot services engine 404 to perform the functionality discussed below.

The chassis 402 may also support a communication system 408 that is coupled to the SCP boot services engine 404 (e.g., via a coupling between the communication system 408 and the SCP processing system) and that, in the illustrated embodiment, includes a Network Interface Controller (NIC) subsystem 408a (e.g., an Ethernet subsystem) that is configured to connect the SCP subsystem 400 to the network 204 discussed above with reference to FIG. 2, a component connection subsystem 408b that is configured to couple the SCP subsystem 400 to any of the components included in and/or connected to the computing system 300 of FIGS. 3A and 3B, as well as any other communication components (e.g., wireless communication systems (e.g., BLUETOOTH®, Near Field Communication (NFC) components, WiFi components, etc.)) that would be apparent to one of skill in the art in possession of the present disclosure.

As such, the communication system 408 may include any of the connections discussed below between the SCP subsystem 400 and the network 204, the central processing subsystem 306, the graphics processing subsystem 307, the BIOS subsystem 308, the boot storage device 308a, the BMC subsystem 310, the I/O device(s) 312, the FPGA device(s) 313, and/or any other components utilized with the computing system 202a/300. For example, the component connection subsystem 408b may include a CxL Root .mem/

.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components (e.g., a local memory, embedded FPGA device(s), a Non-Volatile Memory express (NVMe) emulation subsystem between the SCP boot services engine 404 and the CxL Root .mem/.cache subsystem discussed above, etc.) and/or other component configurations for providing the functionality discussed below while remaining within the scope of the present disclosure as well.

Figure 5:
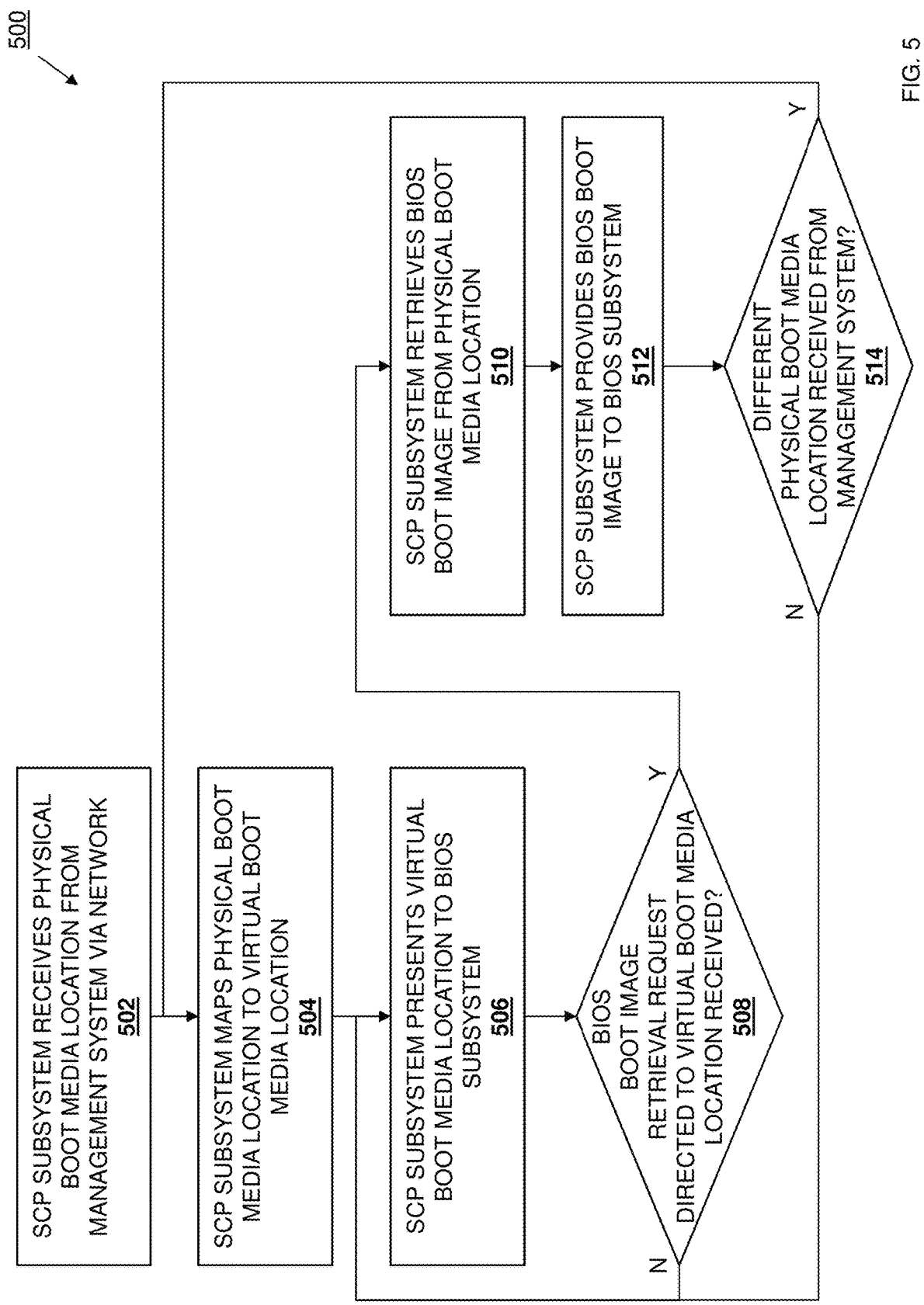
FIG. 5 is a flow chart illustrating an embodiment of a method for booting a computing system using an SCP subsystem.

Referring now to FIG. 5, an embodiment of a method 500 for booting a computing system using an SCP subsystem is illustrated. As discussed below, the systems and methods of the present disclosure provide an SCP subsystem that manages the boot process (e.g., the boot media and boot image) utilized to boot the computing system in which it is located. For example, the SCP boot system of the present disclosure may include a chassis housing a BIOS subsystem and an SCP subsystem that presents a virtual BIOS boot media location to the BIOS subsystem. The SCP subsystem may receive a first physical boot media location from a management system and, when the SCP subsystem receives a first BIOS boot image retrieval request from the BIOS subsystem that is directed to the virtual BIOS boot media location, it retrieves a first BIOS boot image from the first physical boot media location and provides it to the BIOS subsystem. In some embodiments, the SCP subsystem may then receive a second physical boot media location from the management system and, when the SCP subsystem receives a second BIOS boot image retrieval request from the BIOS subsystem that is directed to the virtual BIOS boot media location, it retrieves a second BIOS boot image from the second physical boot media location and provides it to the BIOS system. As such, boot media may be provided on or accessible to the SCP subsystem such that the SCP subsystem controls that boot media and the boot image stored thereon, and in some examples may be removed from the computing system (e.g., to provide a "stateless" Bare Metal Server (BMS)), thus allowing for the elimination of the "middle man" (e.g., a BMC subsystem) in automated boot image location modification, as well as the elimination of the need for a modifiable BIOS boot image location subsystem that requires non-volatile memory space that is accessible to the BIOS subsystem.

As discussed in further detail below, the SCP subsystem 304/400 in the computing system 202a/300 may be configured to control any BIOS boot media location that stores a BIOS boot image utilized by the BIOS subsystem 308 to boot the computing system 202a/300. In some embodiments, during or prior to the method 500, the BIOS subsystem 308 in the computing system 202a/300 may be configured to only boot from a virtual boot media location that is provided by the SCP subsystem 304/400 in the computing system 202a/300 as discussed below. For example, in computing systems that are manufactured with both the BIOS subsystem 308 and SCP subsystem 304 discussed below, and that are configured to perform the SCP boot functionality of the present disclosure, the BIOS subsystem 308 may be "hardwired" or otherwise "permanently" programmed such that the BIOS subsystem 308 will operate to only access a virtual boot media location provided by the SCP subsystem 304/400 when performing boot operations for the computing system 202a/300, and one of skill in the art in possession of the present disclosure will recognize how that "permanent" programming may not be easily modifiable by a user (e.g., that "permanent" programming may not be provided on a non-volatile memory subsystem that conventionally is used to stored BIOS boot media locations).

However, in other embodiments and during or prior to the method 500, the BIOS subsystem 308 in the computing system 202a/300 may be reconfigured to boot from a virtual boot media location that is provided by the SCP subsystem 304/400 in the computing system 202a/300 as discussed below. For example, in conventional computing systems manufactured with a BIOS subsystem 308 that utilizes the prioritized BIOS boot media locations stored in a non-volatile memory subsystem as discussed above, an SCP subsystem 304 that is configured to perform the SCP boot functionality of the present disclosure may be added to that conventional computing system, and that SCP subsystem 304/400 may then reprogram the non-volatile memory subsystem that is accessible to that BIOS subsystem 308 such that the BIOS subsystem 308 will operate to access a virtual boot media location provided by the SCP subsystem 304/400 when performing boot operations for the computing system 202a/300.

In a specific example of the BIOS subsystem reconfiguration discussed above, the SCP boot services engine 404 in the SCP subsystem 304/400 in the computing system 202a/300 may instruct (e.g., via the component connection subsystem 408b in the communication system 408) the BMC subsystem 310 in the computing system 202a/300 to modify the non-volatile memory subsystem that is accessible to the BIOS subsystem 308 in order to provide the highest priority to the virtual boot media location provided by the SCP subsystem 304/400, and such communications may be performed via an automatic "handshake" that occurs between the SCP subsystem 304/400 and the BMC subsystem 310 upon initialization of the SCP subsystem 304/400 in the computing system 202a/300 (e.g., a BMS) that includes the BMC subsystem 310. However, while a few examples of the setting of the BIOS subsystem 308 in the computing system 202a/300 to perform boot operations from the virtual boot media location provided by the SCP subsystem 304/400 in the computing system 202a/300 are provided, one of skill in the art in possession of the present disclosure will recognize that the BIOS subsystem 308 in the computing system 202a/300 may be configured to boot from the SCP subsystem 304/400 in the computing system 202a/300 using a variety of techniques that will fall within the scope of the present disclosure as well.

Figure 6A:
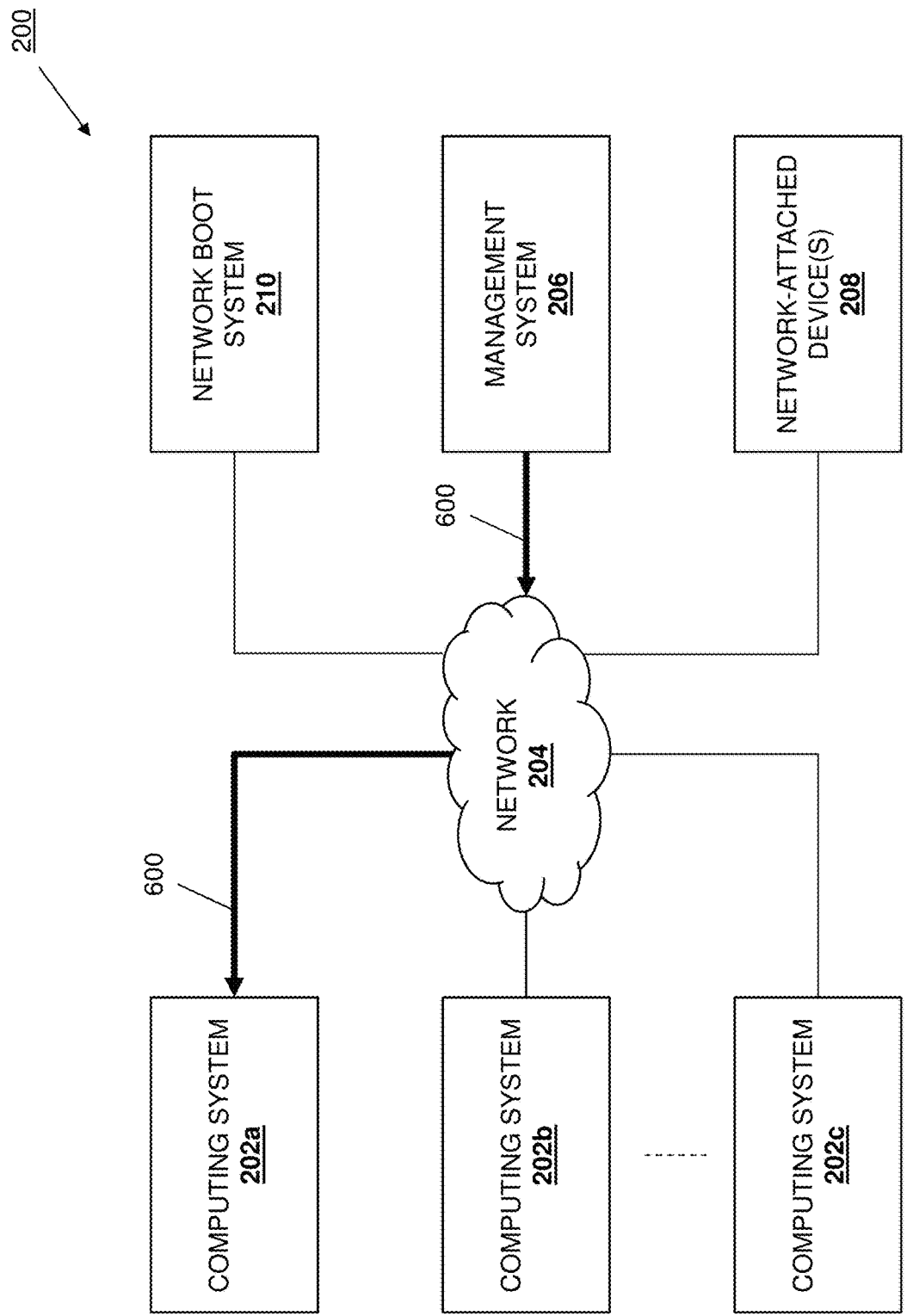
FIG. 6A is a schematic view illustrating an embodiment of the networked system of FIG. 2 operating during the method of FIG. 5.
Figure 6B:
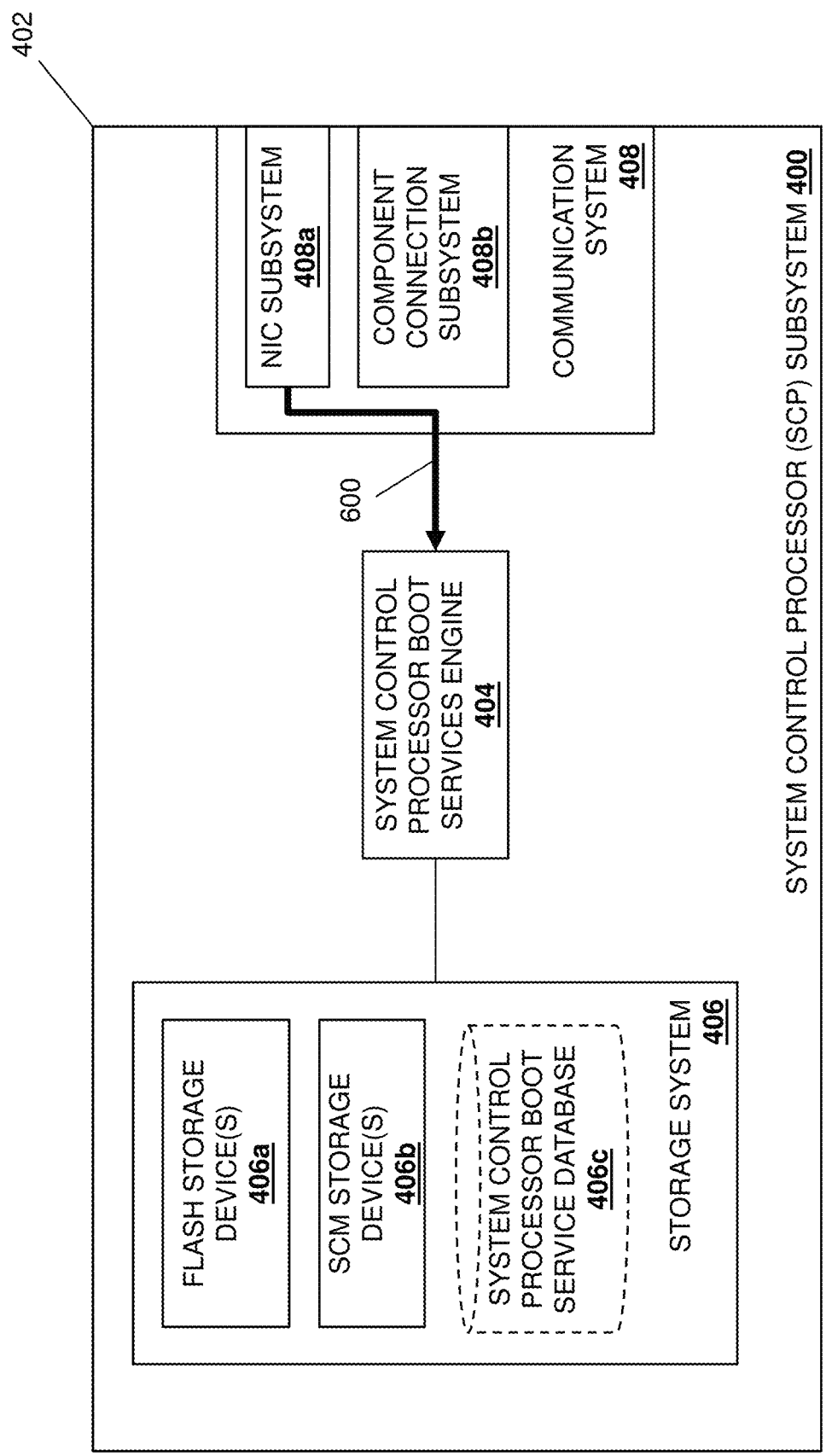
FIG. 6B is a schematic view illustrating an embodiment of the SCP subsystem of FIG. 4 operating during the method of FIG. 5.

The method 500 begins at block 502 where an SCP subsystem receives a physical boot media location from a management system via a network. With reference to FIGS. 6A and 6B, in an embodiment of block 502, the management system 206 may perform physical boot media location transmission operations 600 that include generating and transmitting a physical boot media location via the network 204 to the SCP subsystem 304/400 in the computing system 202a/300 such that the SCP boot services engine 404 receives that physical boot media location via the NIC subsystem 408a in the communication system 408. For example, the management system 206 may be provided by an SCP manager system that is configured to manage the SCP subsystems 304 included in the computing systems 202a-202c and, in particular, define one or more physical boot media locations utilized by those SCP subsystems 304 to provide BIOS boot images to the BIOS subsystems 308 in their respective computing systems 202a-202c. As such, while the physical boot media location(s) are illustrated and described as being transmitted to the computing system 202a/300, one of skill in the art in possession of the present disclosure will recognize that a network administrator or other user may utilize the management system 206 to define the physical boot media location(s) and BIOS boot image(s) that may be utilized by the BIOS subsystems 308 to boot any of the computing systems 202a-202c.

As discussed in further detail below, the physical boot media location(s) identified in the physical boot media location transmission operations 600 with the computing system 202a/300 may include the boot storage device 308a in the computing system 202a/300, the network boot system 210, the network attached device(s) 208 that provide a network-attached storage system, the SCP subsystem(s) 304 in the other computing systems 202b and up to 202c, and/or any other location that one of skill in the art in possession of the present disclosure would recognize as capable of including physical boot media that may store BIOS boot images. In many examples, only a single physical boot media location may be transmitted to the SCP subsystem 304 in the computing system 202a/300 at block 502. However, in some examples, multiple physical boot media locations may be transmitted to the SCP subsystem 304 in the computing system 202a/300 at block 502 and, as discussed below, those physical boot media locations may be prioritized (e.g., by the management system 206 or the SCP subsystem 304 in the computing system 202a/300) such that the physical boot media location with the highest priority that is currently available will be used to retrieve a BIOS boot image during any particular boot operation performed by the BIOS subsystem 308/computing system 202a/300.

In some embodiments, any physical boot media location transmitted to the SCP subsystem 304 in the computing system 202a/300 at block 502 may include one or more BIOS boot images. For example, any physical boot media location transmitted to the SCP subsystem 304 in the computing system 202a/300 at block 502 may include a single BIOS boot image that will be utilized to boot the computing system 202a/300 when that physical boot media location is accessed during boot operations by the BIOS subsystem 308/computing system 202a/300. However, in other examples, any physical boot media location transmitted to the SCP subsystem 304 in the computing system 202a/300 at block 502 may include a multiple prioritized BIOS boot images such that the BIOS boot image with the highest priority that is currently available will be utilized to boot the computing system 202a/300 when the physical boot media location in which it is stored is accessed during boot operations by the BIOS subsystem 308/computing system 202a/300.

In some embodiments, any physical boot media location transmitted to the SCP subsystem 304 in the computing system 202a/300 at block 502 may include an instruction to retrieve one or more BIOS boot images and store those BIOS boot images(s) in that physical boot media location. For example, at block 502 the physical boot media location transmitted by the management system 206 to the SCP subsystem 304 in the computing system 202a/300 at block 502 may identify the boot storage device 308a in the computing system 202a/300 as the physical boot media location, and may include an instruction to retrieve and store one or more BIOS boot images from the network-attached storage system provided by the network-attached device(s) 208 in the boot storage device 308a, which may cause the SCP boot services engine 404 to retrieve (e.g., via the NIC subsystem 408a in the communication system 408 and the network 204) the identified BIOS boot image(s) from the network-attached storage system provided by the network-attached device(s) 208 and store (e.g., via the component connection subsystem 408b in the communication 408) the BIOS boot image(s) in the boot storage device 308a. However, while several specific examples of the identification of physical boot media location(s) and BIOS boot images for use by the SCP subsystem 304 have been described, one of skill in the art in possession of the present disclosure will appreciate that the physical boot media location(s) and BIOS boot image(s) stored in those locations may be provided, identified, and/or otherwise defined for use by the SCP subsystem 304 as discussed below in a variety of manners that will fall within the scope of the present disclosure as well.

Figure 6C:
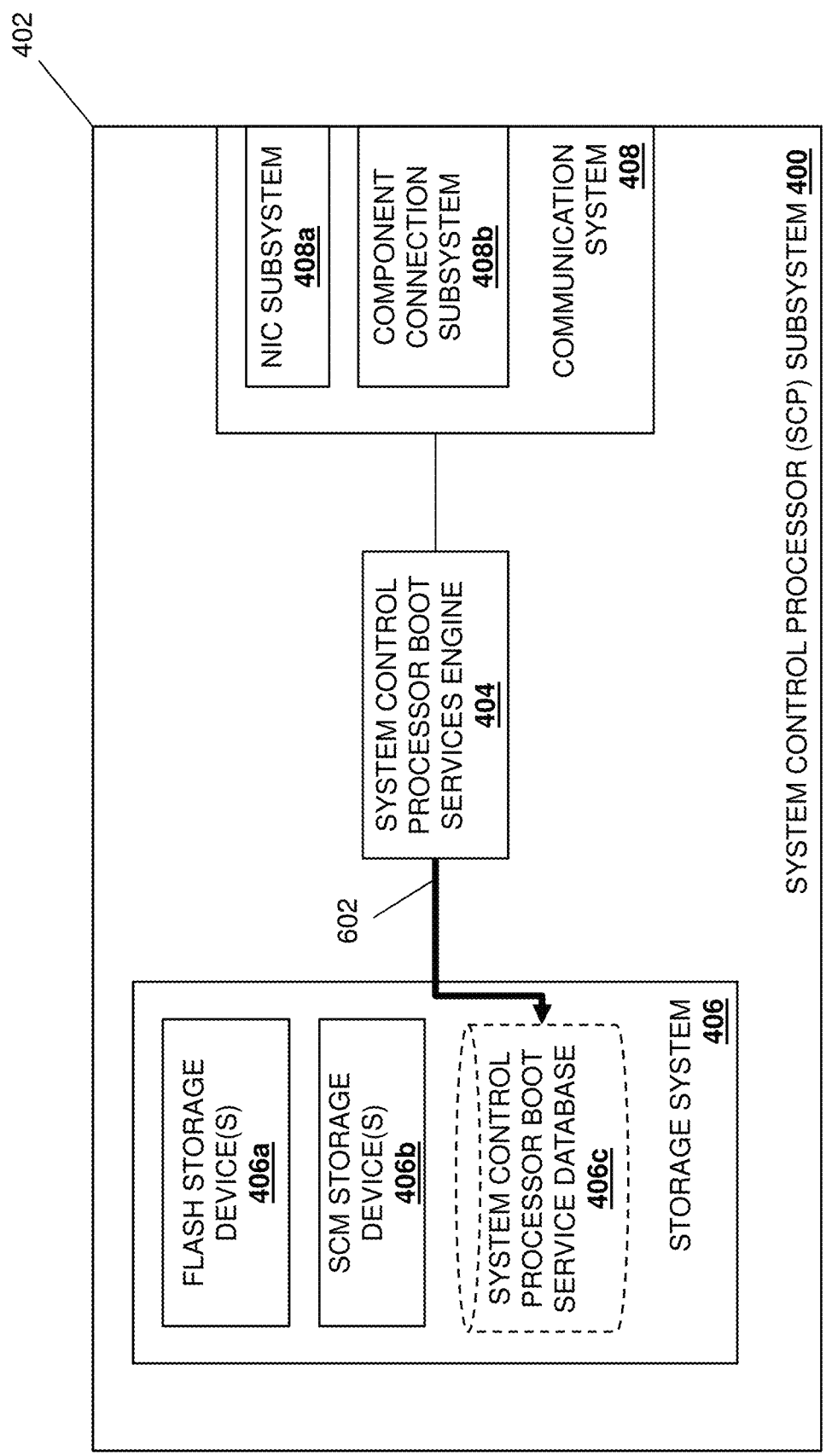
FIG. 6C is a schematic view illustrating an embodiment of the SCP subsystem of FIG. 4 operating during the method of FIG. 5.

The method 500 then proceeds to block 504 where the SCP subsystem maps the physical boot media location to a virtual boot media location. With reference to FIG. 6C, in an embodiment of block 504, the SCP boot services engine 404 may perform physical boot media location/virtual boot media location mapping operations 602 that include mapping the physical boot media location(s) received at block 502 to a virtual boot media location (which may be provided by the SCP boot services engine 404) in the SCP boot services database 406c, and one of skill in the art in possession of the present disclosure will recognize that a variety of physical boot media location/virtual boot media location mapping operations 602 may be performed to map the physical boot media location(s) received at block 502 from the management system 206 to a virtual boot media location that is presented by the SCP boot services engine 404 to the BIOS subsystem 308 while remaining within the scope of the present disclosure.

Figure 6D:
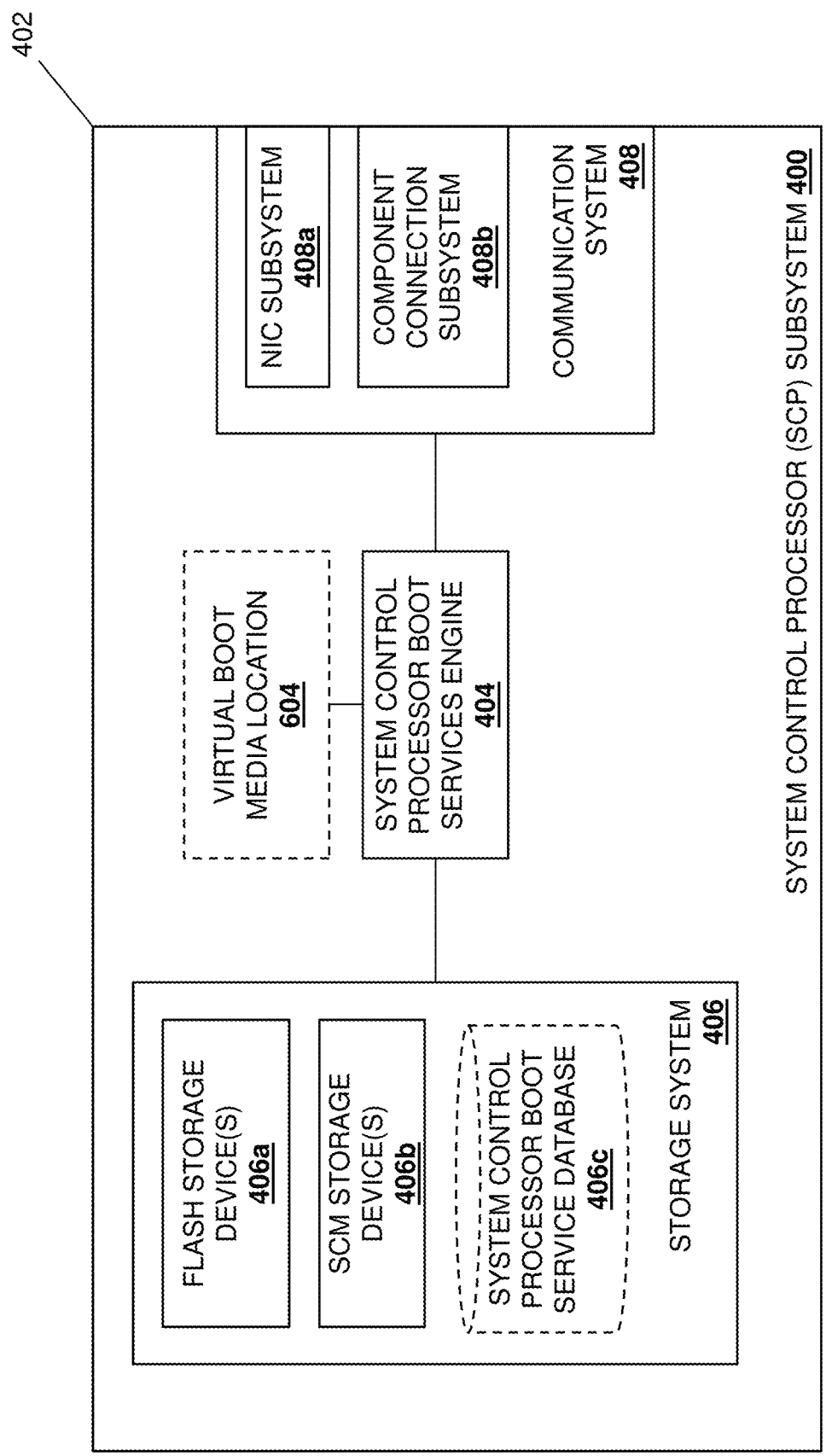
FIG. 6D is a schematic view illustrating an embodiment of the SCP subsystem of FIG. 4 operating during the method of FIG. 5.

The method 500 then proceeds to block 506 where the SCP subsystem presents the virtual boot media location to the BIOS subsystem. With reference to FIG. 6D, in an embodiment of block 506, the SCP boot services engine 404 may provide a virtual boot media location 604 by, for example, emulating a boot media device/location (e.g., an address range on a virtual Non-Volatile Memory express Over Fabrics (NVMe-OF) storage device) to the central processing subsystem 306 (e.g., the x86 processing system) and BIOS subsystem 308 during initialization of the computing system 202a/300. As discussed below, that emulated boot media device/location may be the virtual boot media location that the BIOS subsystem 308 was previously configured to utilize during boot operations to boot the computing system 202a/300. However, while a specific technique for presenting the virtual boot media location 604 to the BIOS subsystem 308 during the initialization of the computing system 202a/300 has been described, one of skill in the art in possession of the present disclosure will recognize that the SCP boot services engine 404/SCP subsystem 304/400 may present the virtual boot media location 604 to the BIOS subsystem 308 in a variety of manners that will cause the central processing subsystem 306 (e.g., the x86 processing system) and BIOS subsystem 308 to see the virtual boot media location 604 as the only available boot media location, or see the virtual boot media location 604 as the highest priority boot media location that is available to the BIOS subsystem 308 for performing boot operations for the computing system 202a/300.

The method 500 then proceeds to decision block 508 where it is determined whether a boot image retrieval request that is directed to a virtual boot media location has been received. In an embodiment, at decision block 508, the SCP boot services engine 404 in the SCP subsystem 304/400 in the computing system 202*a*/300 may monitor for a boot image retrieval request from the BIOS subsystem 308. As will be appreciated by one of skill in the art in possession of the present disclosure, any power-on, reset, reboot, and/or other initialization of the computing system 202*a*/300 may cause the SCP subsystem 304/400 in that computing system 202*a*/300 to initialize (e.g., begin, perform, and complete SCP boot operations), and may also initiate the initialization of the computing system 202*a*/300 via the BIOS subsystem 308 such that the BIOS subsystem 308 generates and transmits a BIOS boot image retrieval request. For example, the initiation of the initialization of the computing system 202*a*/300 via the BIOS subsystem 308 will cause the BIOS subsystem 308 to identify the virtual boot media location 604 that it has been programmed to retrieve the BIOS boot image from for use in booting or otherwise initializing the computing system 202*a*/300, and then generate and transmit a BIOS boot image retrieval request to the SCP subsystem 304/400 and/or virtual boot media location 604 in order to retrieve the BIOS boot image. Thus, at decision block 508, the SCP boot services engine 404 in the SCP subsystem 304/400 in the computing system 202*a*/300 may monitor for that boot image retrieval request from the BIOS subsystem 308

If, at decision block 508, it is determined that a boot image retrieval request that is directed to a virtual boot media location has not been received, the method 500 returns to block 506. As such, following the receiving of the physical boot media location from the management system 206 and the mapping of that physical boot media location to the virtual boot media location, the method 500 may loop such that the SCP subsystem 304/400 presents the virtual boot media location 604 to the BIOS subsystem 308 during initialization of the computing system 202*a*/300 until a boot image retrieval request that is directed to the virtual boot media location 604 is received from the BIOS subsystem 308.

Figure 6E:
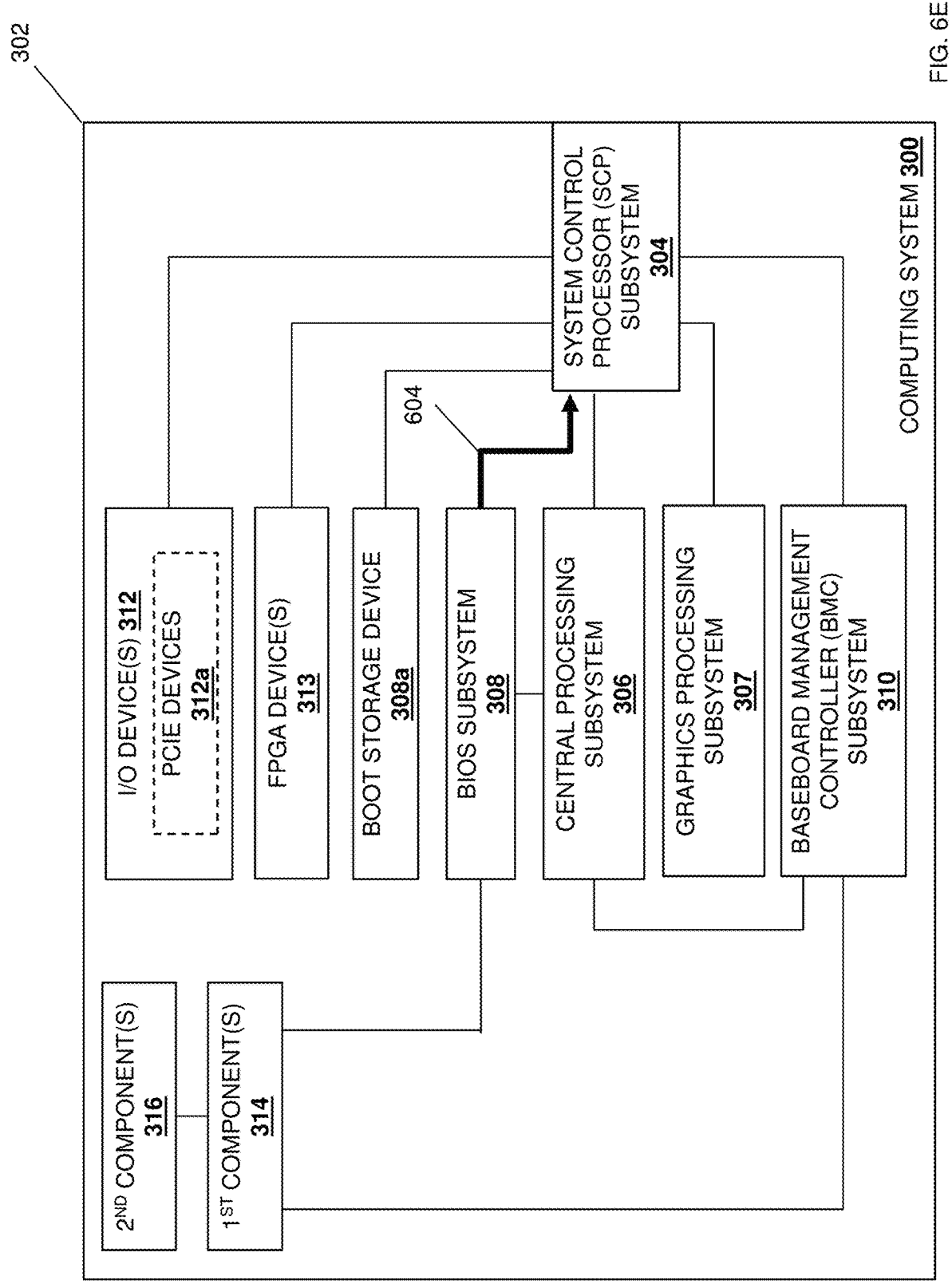
FIG. 6E is a schematic view illustrating an embodiment of the computing system of FIG. 3A operating during the method of FIG. 5.
Figure 6F:
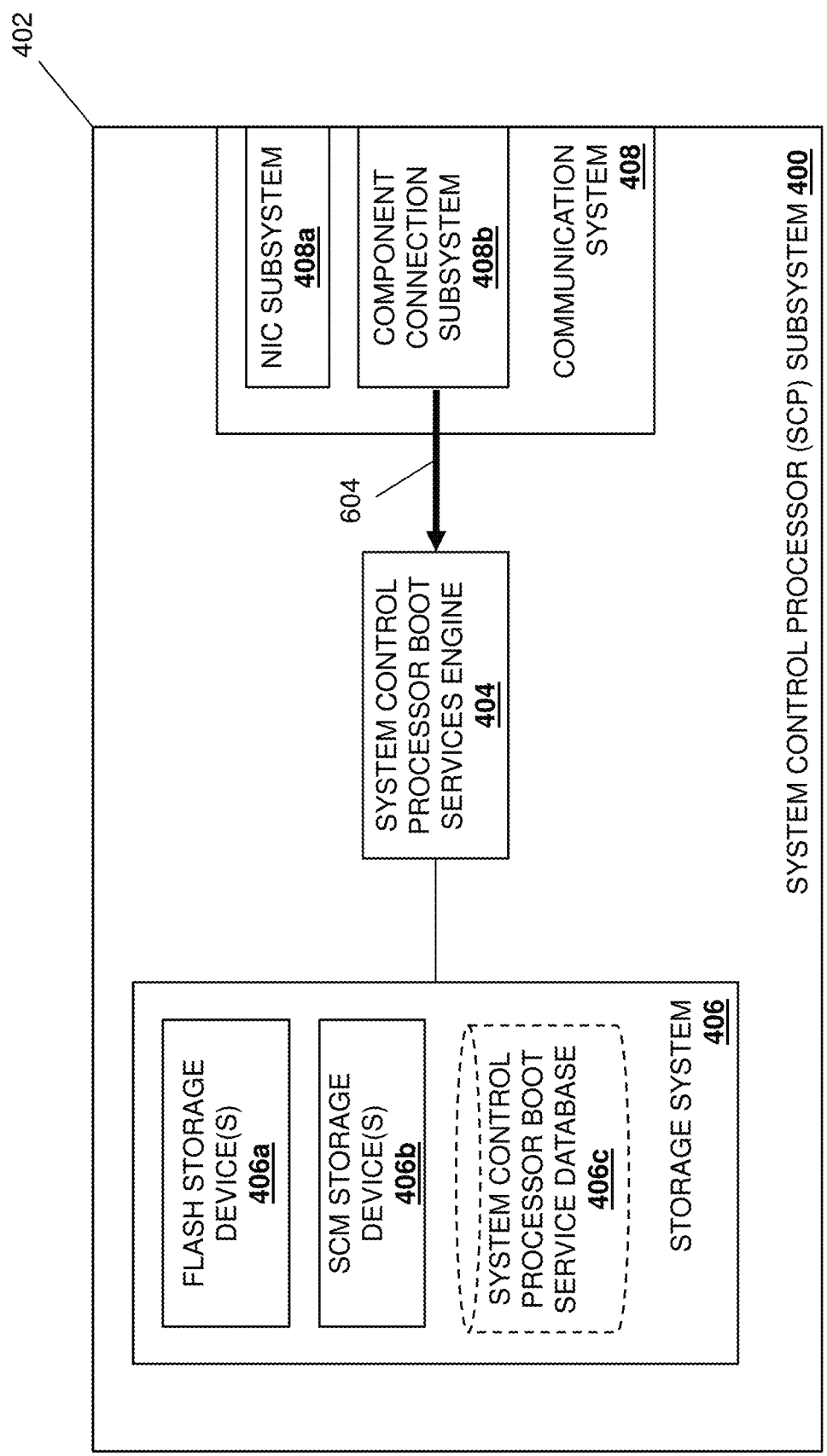
FIG. 6F is a schematic view illustrating an embodiment of the SCP subsystem of FIG. 4 operating during the method of FIG. 5.

If, at decision block 508, it is determined that a boot image retrieval request that is directed to a virtual boot media location has been received, the method 500 proceeds to block 510 where the SCP subsystem retrieves a BIOS boot image from the physical boot media location, as well as to block 512 where the SCP subsystem provides that BIOS boot image to the BIOS subsystem. In an embodiment, at decision block 508, the computing system 202*a*/300 may be powered-on, reset, reboot, and/or otherwise initialized to cause the SCP subsystem 304/400 to initialize (e.g., begin, perform, and complete SCP boot operations), as well as to initiate the initialization of the computing system 202*a*/300 via the BIOS subsystem 308. With reference to FIG. 6E and as discussed above, the initiation of the initialization of the computing system 202*a*/300 via the BIOS subsystem 308 will cause the BIOS subsystem 308 to identify the virtual boot media location 604 that it has been programmed to retrieve the BIOS boot image from for use in booting or otherwise initializing the computing system 202*a*/300, and then perform BIOS boot image retrieval operations 604 that may include generating and transmitting a BIOS boot image retrieval request to the SCP subsystem 304/400 and/or virtual boot media location 604 in order to retrieve the BIOS boot image. As such, at decision block 508 and as part of the BIOS boot image retrieval operations 604, the SCP boot services engine 404 may receive the BIOS boot image retrieval request via the component connection subsystem 408*b* in the communication system 408, as illustrated in FIG. 6F.

Figure 6G:
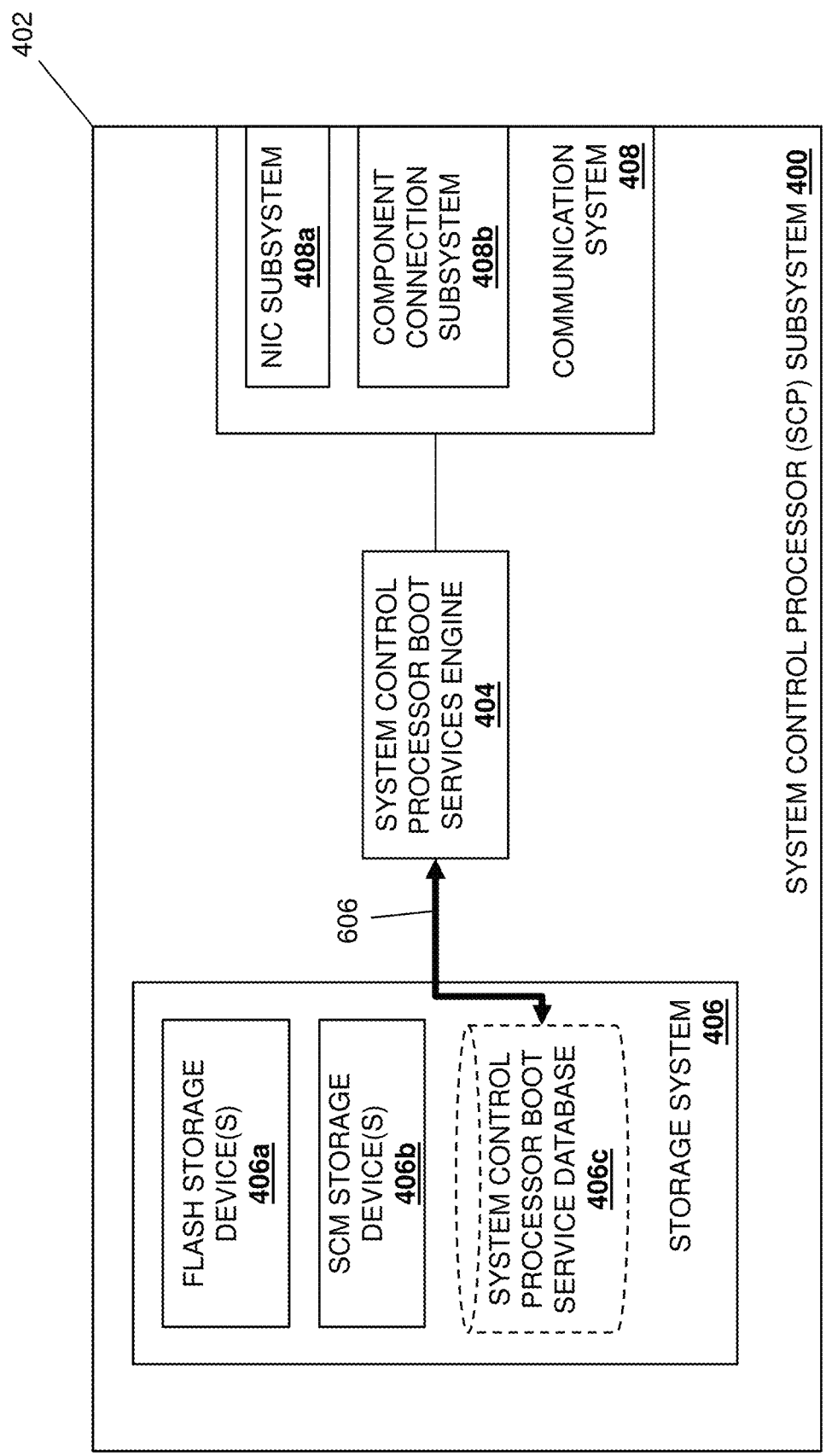
FIG. 6G is a schematic view illustrating an embodiment of the SCP subsystem of FIG. 4 operating during the method of FIG. 5.

With reference to FIG. 6G, in an embodiment of block 510 and in response to receiving the BIOS boot image retrieval request, the SCP boot services engine 404 in the SCP subsystem 304/400 in the computing system 202*a*/300 may perform physical boot media location identification operations 606 that may include identifying the physical boot media location mapped to the virtual boot media location (which was identified in the BIOS boot image retrieval request) in the SCP boot services database 406*c*. As such, for any BIOS boot image retrieval request directed to the virtual boot media location 604 presented to the BIOS subsystem 308 by the SCP boot services engine 404, the SCP boot services engine 404 may identify the physical boot media location(s) that are currently mapped to the virtual boot media location 604 in the SCP boot services database 406*c*. As discussed above, in some embodiments only a single physical boot media location may be mapped to the virtual boot medial location 604 in the SCP boot services database 406*c*, and thus that physical boot media location may be identified at block 510.

However, as also discussed above, in some embodiments multiple prioritized physical boot media locations may be mapped to the virtual boot medial location 604 in the SCP boot services database 406*c*, and thus at block 510 the SCP boot services engine 404 may operate to identify the one of those physical boot media locations with the highest priority that is currently available. Furthermore, as also discussed above, in some embodiments only a single BIOS boot image may be stored in the physical boot media location identified at block 512, and thus at block 510 the SCP boot services engine 404 may identify that BIOS boot image from that identified physical boot media location. However, as also discussed above, in some embodiments multiple prioritized BIOS boot images may be stored in the physical boot media location identified at block 510, and thus at block 510 the SCP boot services engine 404 may operate to identify the one of those BIOS boot images with the highest priority that is currently available. As such, while several specific examples are provided, one of skill in the art in possession of the present disclosure will appreciate that a BIOS boot image in a physical boot media location may be identified at block 510 in a variety of manners that will fall within the scope of the present disclosure as well.

In some embodiments, the SCP boot services engine 404 may be configured to authenticate any BIOS boot image identified at block 510 by, for example, determining that the BIOS boot image is signed with a private key using a public key that is accessible to the SCP boot services engine 404 (e.g., in the SCP boot services database 406*c*, via the network 204, etc.), verifying a hash of the BIOS boot image, and/or via the performance of any other authentication techniques that would be apparent to one of skill in the art in possession of the present disclosure. Furthermore, the SCP boot services engine 404 may be configured to perform real-time BIOS boot image security verification operations independent of the central processing subsystem 306 (e.g., independent of a "running" or otherwise operational host x86 processing system "node"). Further still, in some embodiments, the SCP boot services engine 404 may be configured to prevent the BIOS subsystem 308 from performing boot operations for the computing system 202*a*/300 until the BIOS boot image identified at block 510 is ready for use. For example, in response to receiving the BIOS boot media retrieval request that is directed to the virtual boot media location 604, the SCP boot services engine 404 may identify a physical boot media location and a BIOS boot image stored thereon, determine that the identified BIOS boot image is not ready to allow the BIOS subsystem 308 to boot and, in response, pause the performance of boot operations by the BIOS subsystem 308. Subsequently, the SCP boot services engine 308 may determine that the identified BIOS boot image is ready to allow the BIOS subsystem 308 to boot and, in response, cause the BIOS subsystem 308 to resume the performance of boot operations.

In a specific example and with reference to FIG. 6H, the SCP boot services engine 404 in the SCP subsystem 304/400 in the computing system 202a/300 may identify a BIOS boot image in the boot storage device 308a at block 510 and, in response, may perform BIOS boot image retrieval operations 608 that may include accessing the boot storage device 308a (e.g., via the component connection subsystem 408b in the communicating system 408), retrieving the BIOS boot image identified at block 510, and transmitted that BIOS boot image to the BIOS subsystem 308 (e.g., via the component connection subsystem 408b in the communicating system 408) at block 512. As will be appreciated by one of skill in the art in possession of the present disclosure, the BIOS subsystem 308 may then use that BIOS boot image in order to perform variety of initialization operations for the computing system 202a/300 that configure the computing system 202a/300 to perform runtime operations.

Figure 6I:
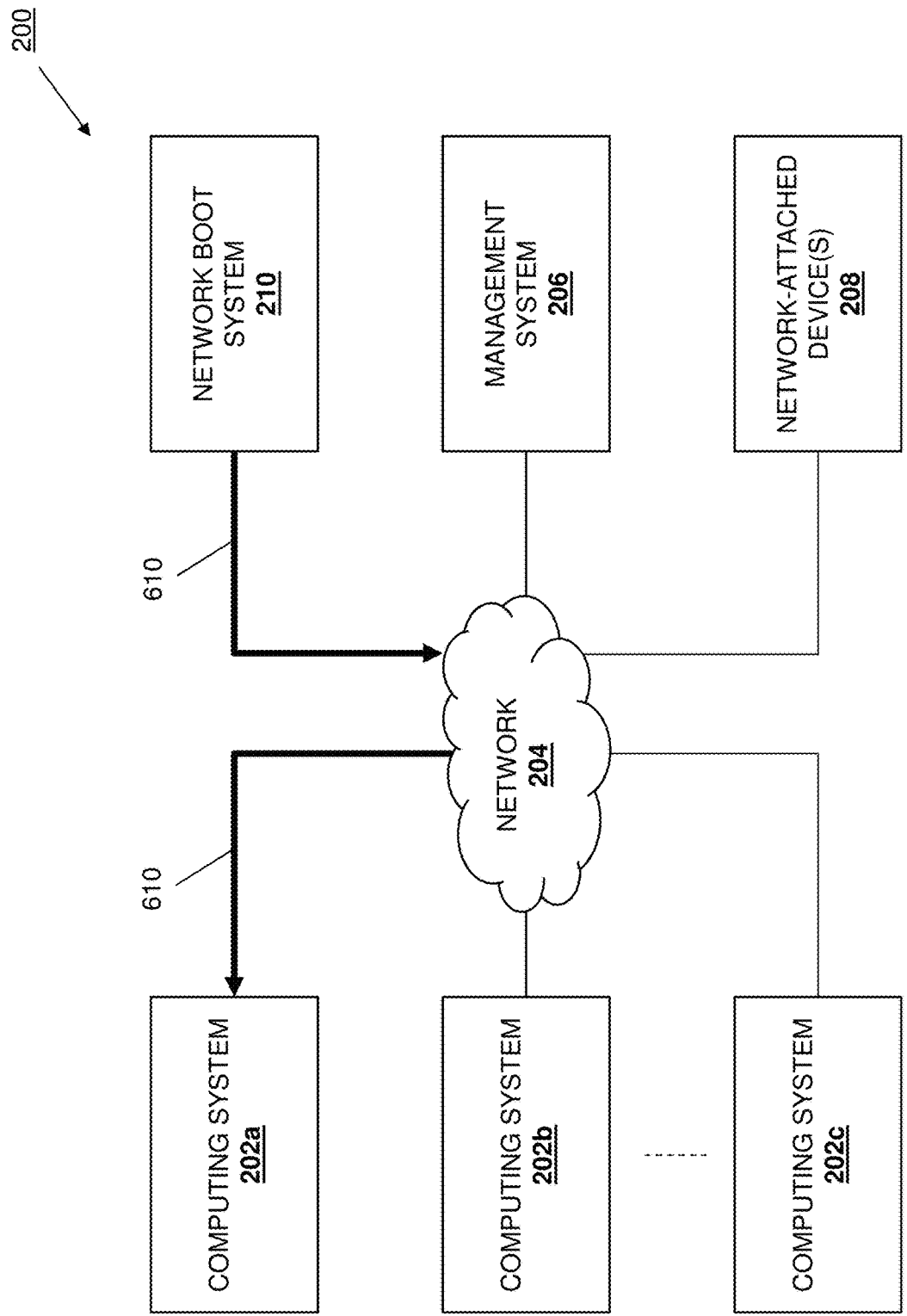
FIG. 6I is a schematic view illustrating an embodiment of the networked system of FIG. 2 operating during the method of FIG. 5.

In another specific example and with reference to FIGS. 6I and 6J, the SCP boot services engine 404 in the SCP subsystem 304/400 in the computing system 202a/300 may identify a BIOS boot image in the network boot system 210 at block 510 and, in response, may perform BIOS boot image retrieval operations 610 that may include accessing the network boot system 210 (e.g., via the NIC subsystem 408a in the communicating system 408), retrieving the BIOS boot image identified at block 512, and transmitted that BIOS boot image to the BIOS subsystem 308 (e.g., via the component connection subsystem 408b in the communicating system 408) at block 512. As will be appreciated by one of skill in the art in possession of the present disclosure, the BIOS subsystem 308 may then use that BIOS boot image in order to perform variety of initialization operations for the computing system 202a/300 that configure the computing system 202a/300 to perform runtime operations.

Figure 6K:
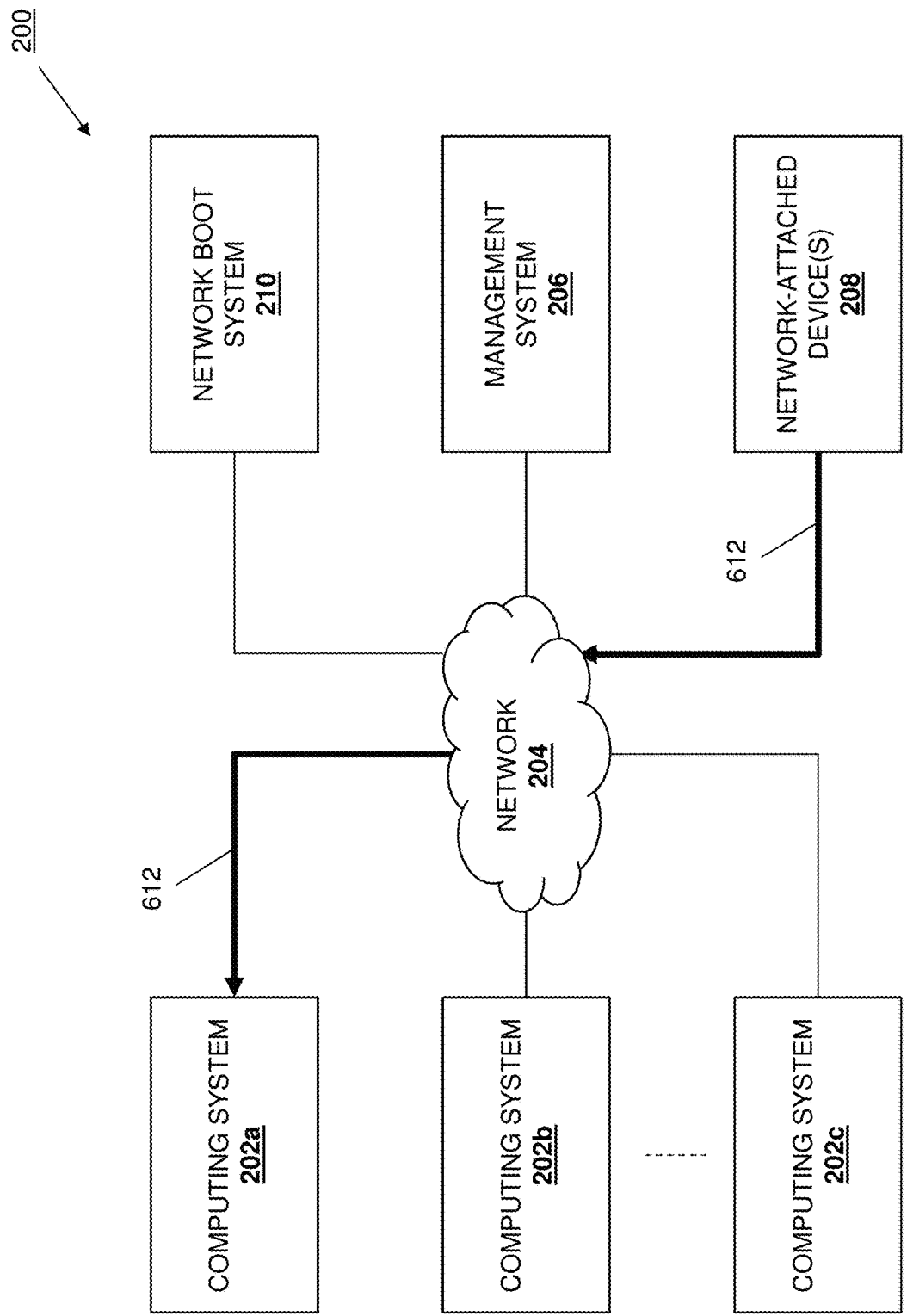
FIG. 6K is a schematic view illustrating an embodiment of the networked system of FIG. 2 operating during the method of FIG. 5.
Figure 6L:
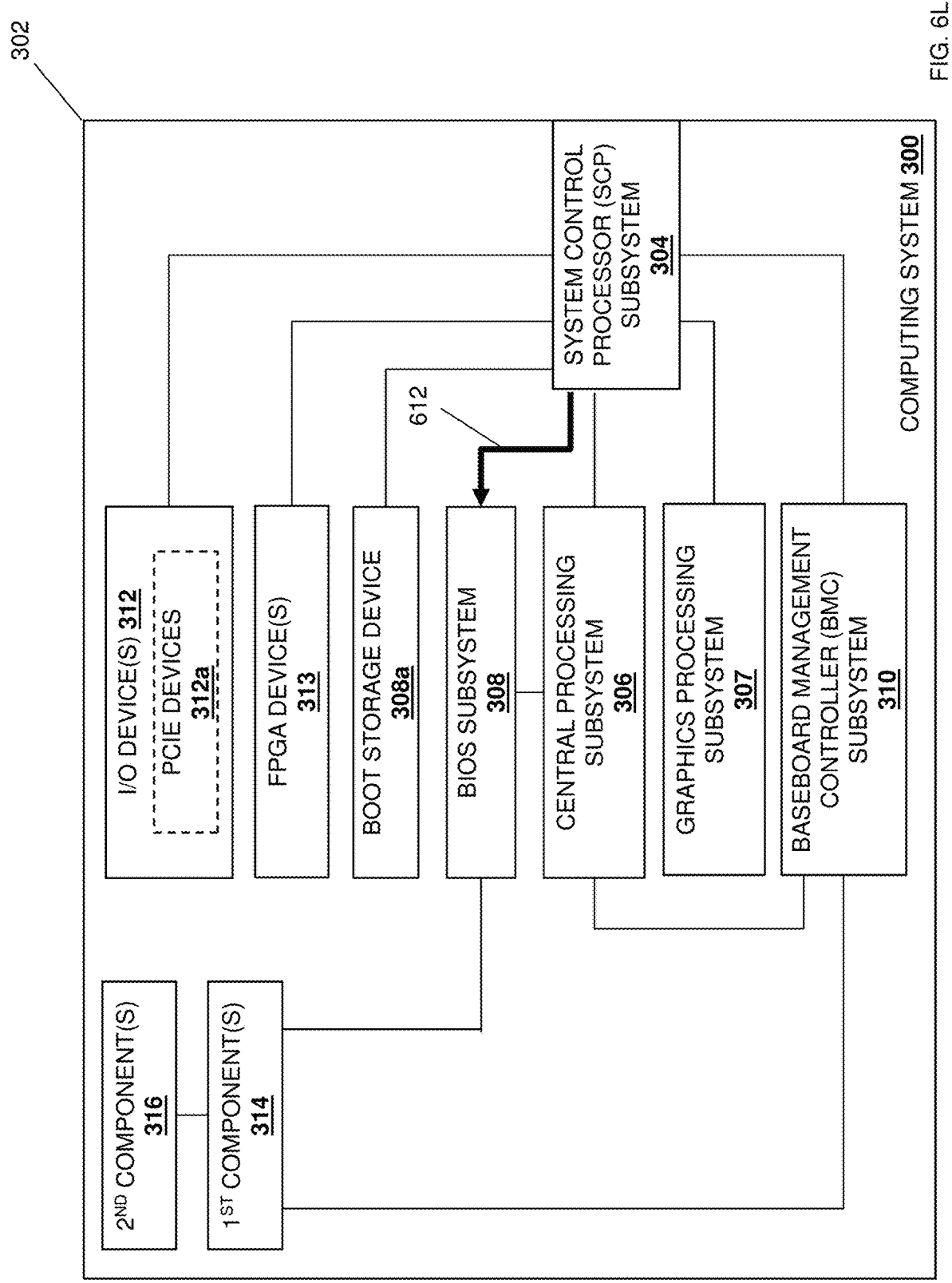
FIG. 6L is a schematic view illustrating an embodiment of the computing system of FIG. 3A operating during the method of FIG. 5.

In another specific example and with reference to FIGS. 6K and 6L, the SCP boot services engine 404 in the SCP subsystem 304/400 in the computing system 202a/300 may identify a BIOS boot image in the network-attached storage system provided by the network-attached device(s) 208 at block 510 and, in response, may perform BIOS boot image retrieval operations 612 that may include accessing the network-attached storage system provided by the network-attached device(s) 208 (e.g., via the NIC subsystem 408a in the communicating system 408), retrieving the BIOS boot image identified at block 510, and transmitted that BIOS boot image to the BIOS subsystem 308 (e.g., via the component connection subsystem 408b in the communicating system 408) at block 512. As will be appreciated by one of skill in the art in possession of the present disclosure, the BIOS subsystem 308 may then use that BIOS boot image in order to perform variety of initialization operations for the computing system 202a/300 that configure the computing system 202a/300 to perform runtime operations.

Figure 6M:
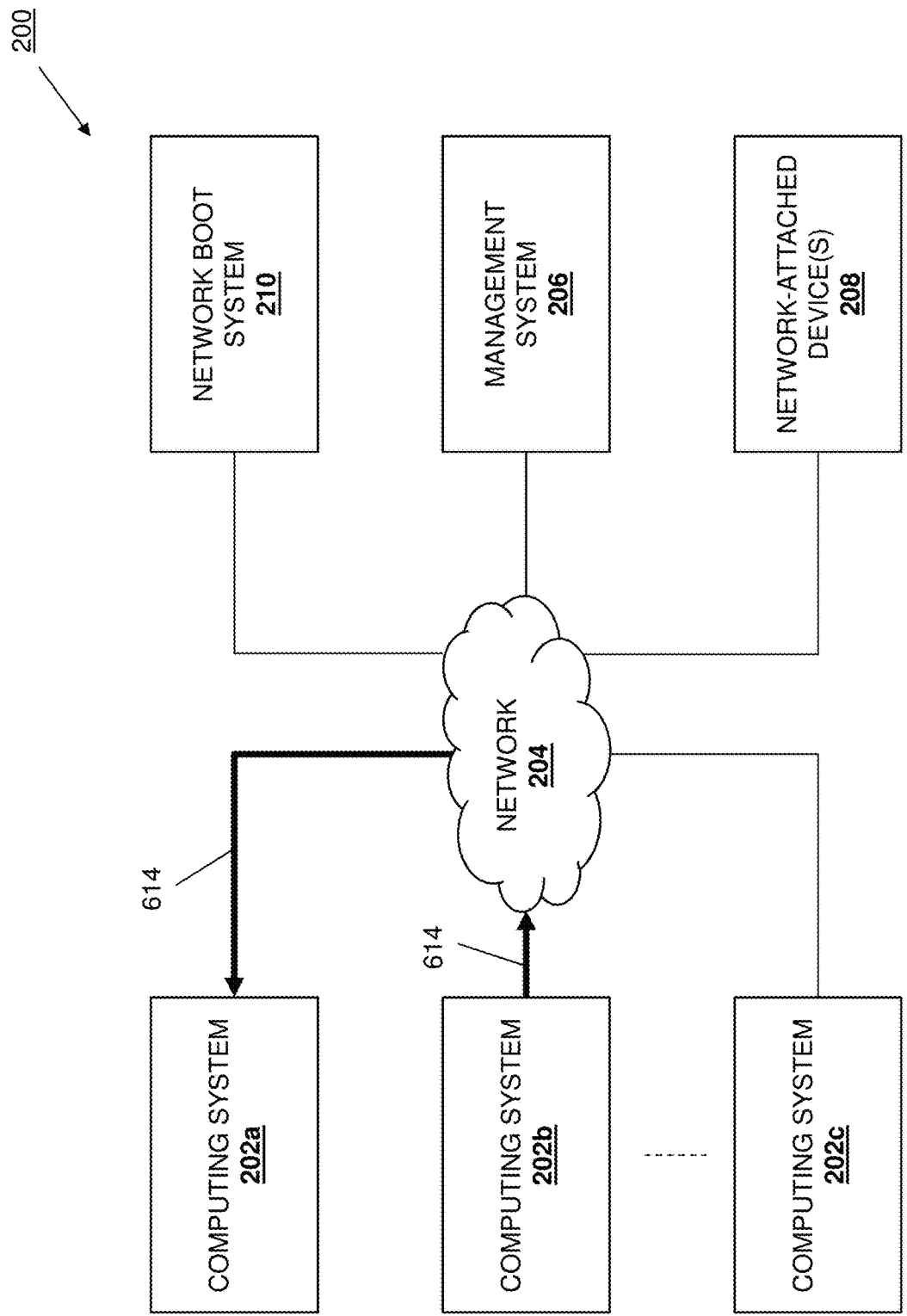
FIG. 6M is a schematic view illustrating an embodiment of the networked system of FIG. 2 operating during the method of FIG. 5.

In another specific example and with reference to FIGS. 6M and 6N, the SCP boot services engine 404 in the SCP subsystem 304/400 in the computing system 202a/300 may identify a BIOS boot image that is accessible via the SCP subsystem 304/400 in the computing system 202b/300 at block 510 and, in response, may perform BIOS boot image retrieval operations 614 that may include accessing the SCP subsystem 304/400 in the computing system 202b/300 (e.g., via the NIC subsystem 408a in the communicating system 408), retrieving the BIOS boot image identified at block 510, and transmitted that BIOS boot image to the BIOS subsystem 308 (e.g., via the component connection subsystem 408b in the communicating system 408) at block 512. In an embodiment, the retrieval of the BIOS boot image via the SCP subsystem 304/400 in the computing system 202b/300 may include that SCP subsystem 304/400 in the computing system 202b/300 retrieving that BIOS boot image from the boot storage device 308a in the computing system 202b/300 and providing that BIOS boot image to the SCP subsystem 304/400 in the computing system 202a/300, as well as accessing a BIOS boot image from any of the other physical boot media locations discussed above. As will be appreciated by one of skill in the art in possession of the present disclosure, the BIOS subsystem 308 may then use that BIOS boot image in order to perform variety of initialization operations for the computing system 202a/300 that configure the computing system 202a/300 to perform runtime operations. Furthermore, one of skill in the art in possession of the present disclosure will appreciate that the use of BIOS boot images stored in other computing systems may provide BIOS boot image redundancy without additional storage costs.

The method 500 then proceeds to decision block 514 where the method 500 proceeds depending on whether a different physical boot media location is received from the management system. If, at decision block 514, a different physical boot media location is been received from the management system 206, the method 500 returns to block decision block 504. As such, the method 500 may loop such that SCP subsystem 304 presents the virtual boot media location 604 to the BIOS subsystem 308, determines whether a BIOS boot image retrieval request directed to the virtual boot media location 604 has been received from the BIOS subsystem 308 and, if so, retrieves a BIOS boot image from the physical boot media location currently mapped to the virtual boot media location 604, and provides that BIOS boot image to the BIOS subsystem 308, as long as a different physical boot media location has not been received from the management system 206.

If, at decision block 508, a different physical boot media location is received from the management system 206, the method 500 returns to block 504. As will be appreciated by one of skill in the art in possession of the present disclosure, at decision block 514 the management system 206 may operate substantially as described above with reference to block 502 to transmit a different physical media location to the SCP subsystem 304/400 in the computing system 202a/300 and, on the second iteration of the method 500, the SCP subsystem 304/400 may operate to map that different physical boot media location to the virtual boot media location 604 to block 504, present the virtual boot medial location to the BIOS subsystem 308 at block 506, determine whether a boot image retrieval request directed to the virtual boot media location 604 has been received at decision block 508 and, if so, retrieve the BIOS boot image from that different physical boot media location at block 510, and provide that BIOS boot image to the BIOS subsystem at block 512. Thus, the management system 206 may change the physical boot media location utilized by the SCP subsystem 304/400 to provide a BIOS boot image to the BIOS subsystem 308 in the computing system 202a/300 by transmitting that physical boot media location to that SCP subsystem 304/400 at decision block 514, and thus may change the BIOS boot image utilized by that BIOS subsystem 308 in booting the computing system 202a/300 by identifying a physical boot media location to the SCP subsystem 304/400 that stores the desired BIOS boot image.

Thus, systems and methods have been described that provide an SCP subsystem that manages the boot process (e.g., the boot media and boot image) utilized to boot its server device. For example, the SCP boot system of the present disclosure may include a server chassis housing a BIOS subsystem and an SCP subsystem that presents a virtual BIOS boot media location to the BIOS subsystem. The SCP subsystem may receive a first physical boot media location from SCP manager system and, when the SCP subsystem subsequently receives a first BIOS boot image retrieval request from the BIOS subsystem that is directed to the virtual BIOS boot media location, it retrieves a first BIOS boot image from the first physical boot media location and provides it to the BIOS subsystem. In some embodiment, the SCP subsystem may then receive a second physical boot media location from the SCP manager system and, when the SCP subsystem subsequently receives a second BIOS boot image retrieval request from the BIOS subsystem that is directed to the virtual BIOS boot media location, it retrieves a second BIOS boot image from the second physical boot media location and provides it to the BIOS system.

As such, boot media may be provided on, or made accessible to, the SCP subsystem such that the SCP subsystem controls that boot media and the boot image stored thereon, and in some examples may be removed from the server device (e.g., to provide a "stateless" Bare Metal Server (BMS)), thus allowing for the elimination of the "middle man" (e.g., a BMC subsystem) in automated boot image location modification, as well as eliminating the need for a modifiable BIOS boot image location subsystem that requires non-volatile memory space that is accessible to the BIOS subsystem. Furthermore, the SCP subsystem may have full read/write access to local boot media (e.g., the boot storage device discussed above) in order to, for example retrieve and store any desired BIOS boot image on that local boot media. Further still, the SCP subsystems/SCP manager may ensure that SCP subsystems each have the most recent BIOS boot image, that the BIOS subsystems boot from the most recent "golden" BIOS boot image on each boot, and/or that the BIOS subsystems recover from a boot failure by booting from the "golden" BIOS boot image that was most recently used to successfully boot (e.g., a "golden BIOS boot image-1").

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A System Control Processor (SCP) boot system, comprising:
    a computing system chassis;
    a Basic Input/Output System (BIOS) subsystem that is included in the computing system chassis; and
    a first System Control Processor (SCP) subsystem that is included in the computing system chassis and that is coupled to the BIOS subsystem, wherein the first SCP subsystem is configured to:
        receive, from a management system via a network, a first physical boot media location;
        present, to the BIOS subsystem, a virtual BIOS boot media location;
        receive, from the BIOS subsystem, a first BIOS boot image retrieval request that is directed to the virtual BIOS boot media location;
        retrieve, in response to receiving the first BIOS boot media retrieval request that is directed to the virtual BIOS boot media location, a first BIOS boot image from the first physical boot media location; and
        provide the first BIOS boot image to the BIOS subsystem.

2. The system of claim 1, wherein the first SCP subsystem is configured to:
    receive, from the management system via the network, a second physical boot media location;
    present, to the BIOS subsystem, the virtual BIOS boot media location;
    receive, from the BIOS subsystem, a second BIOS boot image retrieval request that is directed to the virtual BIOS boot media location;
    retrieve, in response to receiving the second BIOS boot media retrieval request that is directed to the virtual BIOS boot media location, a second BIOS boot image from the second physical boot media location; and
    provide the second BIOS boot image to the BIOS subsystem.

3. The system of claim 1, wherein the first physical boot media location is one of a local boot storage device that is included in the computing system chassis, a network boot system that is accessible via the network, a network attached storage device that is accessible via the network, and/or a second SCP subsystem that is accessible via the network.

4. The system of claim 1, wherein the first SCP subsystem is configured to:
    retrieve, from a second physical boot media location, the first BIOS boot image; and
    store, in the first physical boot media location, the first BIOS boot image.

5. The system of claim 1, wherein the first SCP subsystem is configured to:
    determine, in response to receiving the first BIOS boot media retrieval request that is directed to the virtual BIOS boot media location, that the first BIOS boot image is not ready to allow the BIOS subsystem to boot;
    pause, in response to determining that the first BIOS boot image is not ready to allow the BIOS subsystem to boot, the performance of boot operations by the BIOS subsystem;
    determine, subsequent to pausing the performance of boot operations by the BIOS subsystem, that the first BIOS boot image is ready to allow the BIOS subsystem to boot; and
    cause, in response to determining that the first BIOS boot image is ready to allow the BIOS subsystem to boot, the BIOS subsystem to resume the performance of boot operations.

6. The system of claim 1, wherein the first SCP subsystem is configured to:
    authenticate, in response to retrieving the first BIOS boot image from the first physical boot media location, the first BIOS boot image.

7. A first System Control Processor (SCP) subsystem, comprising:
a System Control Processor (SCP) processing system; and
an SCP memory system that is coupled to the SCP processing system and that includes instructions that, when executed by the SCP processing system, cause the SCP processing system to provide an SCP boot services engine that is configured to:
receive, from a management system via a network, a first physical boot media location;
present, to a BIOS subsystem, a virtual BIOS boot media location;
receive, from the BIOS subsystem, a first BIOS boot image retrieval request that is directed to the virtual BIOS boot media location;
retrieve, in response to receiving the first BIOS boot media retrieval request that is directed to the virtual BIOS boot media location, a first BIOS boot image from the first physical boot media location; and
provide the first BIOS boot image to the BIOS subsystem.

8. The first SCP subsystem of claim 7, wherein the SCP boot services engine is configured to:
receive, from the management system via the network, a second physical boot media location;
present, to the BIOS subsystem, the virtual BIOS boot media location;
receive, from the BIOS subsystem, a second BIOS boot image retrieval request that is directed to the virtual BIOS boot media location;
retrieve, in response to receiving the second BIOS boot media retrieval request that is directed to the virtual BIOS boot media location, a second BIOS boot image from the second physical boot media location; and
provide the second BIOS boot image to the BIOS subsystem.

9. The first SCP subsystem of claim 7, wherein the first physical boot media location is one of a local boot storage device that is included in a computing system chassis in which the first SCP subsystem is located, a network boot system that is accessible via the network, a network attached storage device that is accessible via the network, and/or a second SCP subsystem that is accessible via the network.

10. The first SCP subsystem of claim 7, wherein the SCP boot services engine is configured to:
retrieve, from a second physical boot media location, the first BIOS boot image; and
store, in the first physical boot media location, the first BIOS boot image.

11. The first SCP subsystem of claim 7, wherein the SCP boot services engine is configured to:
determine, in response to receiving the first BIOS boot media retrieval request that is directed to the virtual BIOS boot media location, that the first BIOS boot image is not ready to allow the BIOS subsystem to boot;
pause, in response to determining that the first BIOS boot image is not ready to allow the BIOS subsystem to boot, the performance of boot operations by the BIOS subsystem;
determine, subsequent to pausing the performance of boot operations by the BIOS subsystem, that the first BIOS boot image is ready to allow the BIOS subsystem to boot; and
cause, in response to determining that the first BIOS boot image is ready to allow the BIOS subsystem to boot, the BIOS subsystem to resume the performance of boot operations.

12. The first SCP subsystem of claim 7, wherein the SCP boot services engine is configured to:
authenticate, in response to retrieving the first BIOS boot image from the first physical boot media location, the first BIOS boot image.

13. The first SCP subsystem of claim 7, wherein the SCP boot services engine is configured to:
identify, from a plurality of BIOS boot images that are stored in respective physical boot media locations and in response to receiving the first BIOS boot media retrieval request that is directed to the virtual BIOS boot media location, the first BIOS boot image that is stored in the first physical boot media location.

14. A method for booting a computing system using a System Control Processor (SCP) subsystem, comprising:
receiving, by a System Control Processor (SCP) subsystem from a management system via a network, a first physical boot media location;
presenting, by the SCP subsystem to a BIOS subsystem, a virtual BIOS boot media location;
receiving, by the SCP subsystem from the BIOS subsystem, a first BIOS boot image retrieval request that is directed to the virtual BIOS boot media location;
retrieving, by the SCP subsystem in response to receiving the first BIOS boot media retrieval request that is directed to the virtual BIOS boot media location, a first BIOS boot image from the first physical boot media location; and
providing, by the SCP subsystem, the first BIOS boot image to the BIOS subsystem.

15. The method of claim 14, wherein
receiving, by the SCP subsystem from the management system via the network, a second physical boot media location;
presenting, by the SCP subsystem to the BIOS subsystem, the virtual BIOS boot media location;
receiving, by the SCP subsystem from the BIOS subsystem, a second BIOS boot image retrieval request that is directed to the virtual BIOS boot media location;
retrieving, by the SCP subsystem in response to receiving the second BIOS boot media retrieval request that is directed to the virtual BIOS boot media location, a second BIOS boot image from the second physical boot media location; and
providing, by the SCP subsystem, the second BIOS boot image to the BIOS subsystem.

16. The method of claim 14, wherein the first physical boot media location is one of a local boot storage device that is included in a computing system chassis in which the first SCP subsystem is located, a network boot system that is accessible via the network, a network attached storage device that is accessible via the network, and/or a second SCP subsystem that is accessible via the network.

17. The method of claim 14, wherein
retrieving, by the SCP subsystem from a second physical boot media location, the first BIOS boot image; and
storing, by the SCP subsystem in the first physical boot media location, the first BIOS boot image.

18. The method of claim 14, wherein
determining, by the SCP subsystem in response to receiving the first BIOS boot media retrieval request that is directed to the virtual BIOS boot media location, that the first BIOS boot image is not ready to allow the BIOS subsystem to boot;

pausing, by the SCP subsystem in response to determining that the first BIOS boot image is not ready to allow the BIOS subsystem to boot, the performance of boot operations by the BIOS subsystem;

determining, by the SCP subsystem subsequent to pausing the performance of boot operations by the BIOS subsystem, that the first BIOS boot image is ready to allow the BIOS subsystem to boot; and causing, by the SCP subsystem in response to determining that the first BIOS boot image is ready to allow the BIOS subsystem to boot, the BIOS subsystem to resume the performance of boot operations.

19. The method of claim 14, further comprising:

authenticating, by the SCP subsystem in response to retrieving the first BIOS boot image from the first physical boot media location, the first BIOS boot image.

20. The method of claim 14, further comprising:

identifying, by the SCP subsystem from a plurality of BIOS boot images that are stored in respective physical boot media locations and in response to receiving the first BIOS boot media retrieval request that is directed to the virtual BIOS boot media location, the first BIOS boot image that is stored in the first physical boot media location.

* * * * *